United States Patent
Krishnaswamy et al.

(10) Patent No.: US 10,113,060 B2
(45) Date of Patent: Oct. 30, 2018

(54) BIOBASED RUBBER MODIFIED BIODEGRADABLE POLYMER BLENDS

(71) Applicant: Metabolix, Inc., Cambridge, MA (US)

(72) Inventors: Rajendra K. Krishnaswamy, Pittsburgh, PA (US); Johan van Walsem, Acton, MA (US); Oliver P. Peoples, Arlington, MA (US); Yossef Shabtai, Concord, MA (US); Allen R. Padwa, Worcester, MA (US)

(73) Assignee: CJ Cheiljedang Corporation (KR)

( * ) Notice: Subject to any disclaimer, the term of this patent is extended or adjusted under 35 U.S.C. 154(b) by 715 days.

(21) Appl. No.: 14/406,131

(22) PCT Filed: Jun. 5, 2013

(86) PCT No.: PCT/US2013/044339
§ 371 (c)(1),
(2) Date: Dec. 5, 2014

(87) PCT Pub. No.: WO2013/184822
PCT Pub. Date: Dec. 12, 2013

(65) Prior Publication Data
US 2015/0132512 A1    May 14, 2015

Related U.S. Application Data

(60) Provisional application No. 61/655,983, filed on Jun. 5, 2012, provisional application No. 61/788,090, filed on Mar. 15, 2013.

(51) Int. Cl.
| | |
|---|---|
| *C08L 67/00* | (2006.01) |
| *C08L 67/02* | (2006.01) |
| *C08J 3/24* | (2006.01) |
| *C08L 67/04* | (2006.01) |
| *C08J 5/18* | (2006.01) |

(52) U.S. Cl.
CPC .............. *C08L 67/02* (2013.01); *C08J 3/246* (2013.01); *C08J 5/18* (2013.01); *C08L 67/04* (2013.01); C08J 2367/02 (2013.01); C08J 2367/04 (2013.01); C08J 2467/04 (2013.01); C08L 2201/06 (2013.01); C08L 2205/02 (2013.01); C08L 2205/025 (2013.01); C08L 2205/24 (2013.01); C08L 2207/02 (2013.01); *Y10T 428/1334* (2015.01); *Y10T 442/3146* (2015.04); *Y10T 442/637* (2015.04)

(58) Field of Classification Search
None
See application file for complete search history.

(56) References Cited

U.S. PATENT DOCUMENTS

| | | |
|---|---|---|
| 3,904,579 A | 9/1975 | Braddicks |
| 4,477,654 A | 10/1984 | Holmes et al. |
| 5,281,691 A | 1/1994 | Hubbs et al. |
| 5,391,423 A | 2/1995 | Wnuk et al. |
| 5,391,708 A | 2/1995 | Hubbs et al. |
| 5,462,983 A | 10/1995 | Bloembergen et al. |
| 5,625,029 A | 4/1997 | Hubbs et al. |
| 5,646,217 A | 7/1997 | Hammond |
| 5,756,651 A | 5/1998 | Chen et al. |
| 5,849,374 A | 12/1998 | Gruber et al. |
| 5,849,401 A | 12/1998 | El-Afandi et al. |
| 5,883,199 A | 3/1999 | McCarthy et al. |
| 5,939,467 A | 8/1999 | Wnuk et al. |
| 5,973,100 A | 10/1999 | Asrar et al. |
| 5,994,478 A | 11/1999 | Asrar et al. |
| 6,096,810 A | 8/2000 | Asrar et al. |
| 6,156,852 A | 12/2000 | Asrar et al. |
| 6,191,203 B1 | 2/2001 | Asrar et al. |
| 6,201,083 B1 | 3/2001 | Asrar et al. |
| 6,312,823 B1 | 11/2001 | El-Afandi et al. |
| 6,342,304 B1 | 1/2002 | Buchanan et al. |
| 6,562,938 B2 | 5/2003 | Haile et al. |
| 6,573,340 B1 | 6/2003 | Khemani et al. |
| 6,579,932 B1 | 6/2003 | Schipper et al. |
| 6,579,934 B1 | 6/2003 | Wang et al. |
| 6,645,618 B2 | 11/2003 | Hobbs et al. |
| 6,669,771 B2 | 12/2003 | Tokiwa et al. |
| 6,703,115 B2 | 3/2004 | Hale et al. |
| 6,794,023 B1 | 9/2004 | Melik et al. |
| 6,821,612 B1 | 11/2004 | Melik et al. |
| 6,838,403 B2 | 1/2005 | Tsai et al. |
| 6,890,649 B2 | 5/2005 | Hobbs et al. |
| 6,890,989 B2 | 5/2005 | Wang et al. |
| 7,098,292 B2 | 8/2006 | Zhao et al. |
| 7,144,632 B2 | 12/2006 | Hayes |
| 7,160,977 B2 | 1/2007 | Hale et al. |
| 7,169,860 B2 | 1/2007 | Bastioli et al. |

(Continued)

FOREIGN PATENT DOCUMENTS

| | | |
|---|---|---|
| CN | 1771291 A | 5/2006 |
| CN | 1772810 A | 5/2006 |
| CN | 101205356 | 6/2008 |
| CN | 101265356 A | 9/2008 |
| CN | 103665688 A | 3/2014 |

(Continued)

OTHER PUBLICATIONS

Ishida, K., et al., "Comonomer Unit Composition and Thermal Properties of Poly (3-hydroxybutyrate-co-4-hydroxybutyrate)s Biosynthesized by Ralstonia Eutrop ha.", *Biomacromolecules*, 2:1285-1293 (2001).

(Continued)

*Primary Examiner* — Ana L. Woodward
(74) *Attorney, Agent, or Firm* — Foley Hoag LLP

(57) ABSTRACT

Compositions of biobased polymer blends of polymers and a polyhydroxyalkanoate copolymer are described. In certain embodiments, the copolymer is a multiphase copolymer blend having one phase a glass transition temperature of about −5° C. to about −50° C. Methods of making the compositions of the invention are also described. Also articles, films and laminates made from the compositions are described.

16 Claims, No Drawings

(56) References Cited

U.S. PATENT DOCUMENTS

| | | |
|---|---|---|
| 7,172,814 B2 | 2/2007 | Hodson |
| 7,186,789 B2 | 3/2007 | Hossainy et al. |
| 7,202,289 B2 | 4/2007 | Nozaki et al. |
| 7,212,414 B2 | 5/2007 | Baarman |
| 7,214,414 B2 | 5/2007 | Khemani et al. |
| 7,241,832 B2 | 7/2007 | Khemani et al. |
| 7,264,641 B2 | 9/2007 | Prasad |
| 7,297,394 B2 | 11/2007 | Khemani et al. |
| 7,344,034 B2 | 3/2008 | Heinrich et al. |
| 7,344,784 B2 | 3/2008 | Hodson |
| 7,354,653 B2 | 4/2008 | Germroth et al. |
| 7,368,503 B2 | 5/2008 | Hale |
| 7,368,511 B2 | 5/2008 | Hale et al. |
| 7,449,510 B2 | 11/2008 | Ueda et al. |
| 7,491,213 B2 | 2/2009 | Perreault et al. |
| 7,579,413 B2 | 8/2009 | Mohanty et al. |
| 7,619,025 B2 | 11/2009 | Mohanty et al. |
| 7,678,444 B2 | 3/2010 | Tedford, Jr. et al. |
| 7,718,720 B2 | 5/2010 | Padwa |
| 7,803,298 B2 | 9/2010 | Kanazawa |
| 7,807,773 B2 | 10/2010 | Matsuoka et al. |
| 7,846,987 B2 | 12/2010 | Handa |
| 8,062,476 B2 | 11/2011 | Patel et al. |
| 8,193,298 B2 | 6/2012 | Bastioli et al. |
| 8,231,954 B2 | 7/2012 | Li et al. |
| 8,524,856 B2 | 9/2013 | Krishnaswamy et al. |
| 8,629,212 B2 | 1/2014 | Krishnaswamy et al. |
| 9,056,947 B2 | 6/2015 | Krishnaswamy et al. |
| 9,328,239 B2 * | 5/2016 | Krishnaswamy ....... C08L 67/04 |
| 9,353,258 B2 | 5/2016 | Krishnaswamy et al. |
| 9,650,513 B2 | 5/2017 | Krishnaswamy et al. |
| 2002/0143136 A1 | 10/2002 | Noda et al. |
| 2003/0181555 A1 | 9/2003 | Figuly |
| 2004/0166758 A1 | 8/2004 | Reichmann et al. |
| 2004/0213941 A1 | 10/2004 | Whitehouse |
| 2004/0220355 A1 | 11/2004 | Whitehouse |
| 2004/0225269 A1 | 11/2004 | Zhao et al. |
| 2005/0054813 A1 | 3/2005 | Bastioli et al. |
| 2005/0101228 A1 | 5/2005 | Prasad |
| 2005/0107505 A1 | 5/2005 | Shinoda et al. |
| 2005/0136155 A1 | 6/2005 | Jordan et al. |
| 2005/0137304 A1 | 6/2005 | Strand et al. |
| 2005/0137356 A1 | 6/2005 | Hale et al. |
| 2005/0143502 A1 | 6/2005 | Yamada et al. |
| 2005/0154114 A1 | 7/2005 | Hale |
| 2006/0047026 A1 | 3/2006 | Yamada et al. |
| 2006/0159918 A1 | 7/2006 | Dugan et al. |
| 2006/0183205 A1 | 8/2006 | Masaro et al. |
| 2006/0247387 A1 | 11/2006 | Mohanty et al. |
| 2007/0027247 A1 | 2/2007 | Ueda et al. |
| 2007/0088099 A1 | 4/2007 | Mentink et al. |
| 2007/0203261 A1 | 8/2007 | Narayan et al. |
| 2007/0228046 A1 | 10/2007 | Bastioli et al. |
| 2008/0027178 A1 | 1/2008 | Uradnisheck |
| 2008/0081882 A1 | 4/2008 | Tian et al. |
| 2008/0255267 A1 | 10/2008 | Domb et al. |
| 2008/0281018 A1 | 11/2008 | Seeliger et al. |
| 2008/0311813 A1 | 12/2008 | Ting et al. |
| 2009/0018235 A1 | 1/2009 | Nascimento et al. |
| 2009/0123728 A1 | 5/2009 | Cheung et al. |
| 2009/0148656 A1 | 6/2009 | Hsu |
| 2009/0149570 A1 | 6/2009 | Cheng et al. |
| 2009/0179069 A1 | 7/2009 | Schmidt et al. |
| 2009/0191371 A1 | 7/2009 | Uradnisheck |
| 2009/0215914 A1 | 8/2009 | Hirose et al. |
| 2009/0234035 A1 | 9/2009 | Cheung et al. |
| 2009/0247667 A1 | 10/2009 | Yao et al. |
| 2009/0286075 A1 | 11/2009 | Nakamura et al. |
| 2010/0041835 A1 | 2/2010 | Scherzer et al. |
| 2010/0048767 A1 | 2/2010 | Nascimento et al. |
| 2010/0071170 A1 | 3/2010 | Burout et al. |
| 2010/0076099 A1 | 3/2010 | Mohanty et al. |
| 2010/0089289 A1 | 4/2010 | Mahiat et al. |
| 2010/0193146 A1 | 8/2010 | Patel |
| 2010/0305280 A1 | 12/2010 | Whitehouse |
| 2010/0330382 A1 | 12/2010 | Dou et al. |
| 2011/0124779 A1 | 5/2011 | Whitehouse et al. |
| 2011/0135863 A1 | 6/2011 | Li et al. |
| 2011/0189414 A1 | 8/2011 | Whitehouse |
| 2011/0251349 A1 | 10/2011 | Padwa et al. |
| 2011/0293865 A1 | 12/2011 | Padwa et al. |
| 2012/0107630 A1 | 5/2012 | Krishnaswamy et al. |
| 2012/0108743 A1 | 5/2012 | Krishnaswamy et al. |
| 2013/0065046 A1 | 3/2013 | Krishnaswamy |
| 2013/0317163 A1 | 11/2013 | Krishnaswamy et al. |
| 2015/0132512 A1 | 5/2015 | Krishnaswamy et al. |
| 2015/0147929 A1 | 5/2015 | Krishnaswamy et al. |
| 2015/0203674 A1 | 7/2015 | Weinlein et al. |

FOREIGN PATENT DOCUMENTS

| | | |
|---|---|---|
| EP | 0052460 B1 | 2/1985 |
| EP | 0 648 238 B1 | 9/1999 |
| EP | 1911809 A1 | 4/2008 |
| EP | 1 944 333 A1 | 7/2008 |
| EP | 1950053 A1 | 7/2008 |
| EP | 2060605 A1 | 5/2009 |
| JP | 2003092926 A | 4/2003 |
| JP | 2007-161957 A | 6/2007 |
| WO | WO-1999/14268 A1 | 3/1999 |
| WO | WO-2002/34857 A2 | 5/2002 |
| WO | WO 2002/059201 A1 | 8/2002 |
| WO | WO 2004/076582 | 9/2004 |
| WO | WO 2005/063881 A1 | 7/2005 |
| WO | WO-2006/012670 A1 | 2/2006 |
| WO | WO-2006/087346 A1 | 8/2006 |
| WO | WO-2007/099056 A1 | 9/2007 |
| WO | WO-2008/007919 A1 | 1/2008 |
| WO | WO-2008/037985 A1 | 4/2008 |
| WO | WO-2008/130225 A2 | 10/2008 |
| WO | WO-2009/032864 A1 | 3/2009 |
| WO | WO-2009/137058 A1 | 11/2009 |
| WO | WO-2010/151798 A2 | 12/2010 |
| WO | WO-2010/151811 A2 | 12/2010 |
| WO | WO 2011/146484 A2 | 11/2011 |
| WO | WO 2011/160053 A2 | 12/2011 |
| WO | WO 2013/184822 | 12/2013 |
| WO | WO 2013/184836 | 12/2013 |
| WO | WO-2014017715 A1 | 1/2014 |
| WO | WO-2015/149029 A1 | 10/2015 |

OTHER PUBLICATIONS

Notification Concerning Transmittal of International Search Report, International Application No. PCT/US2011/036808, International Filing Date May 17, 2011, entitled "Toughening Polylactic Acid With Polyhydroxyalkanoates," dated Jan. 17, 2012.

Notification Concerning Transmittal of International Preliminary Report on Patentability, International Application No. PCT/US2011/036808, International Filing Date May 17, 2011, entitled "Toughening Polylactic Acid With Polyhydroxyalkanoates", dated Nov. 20, 2012.

Notification Concerning Transmittal of International Preliminary Report on Patentability, International Application No. PCT/US2013/044339, International Filing Date Jun. 5, 2013, entitled "Biobased Rubber Modified BioDegradable Polymer Blends", dated Dec. 18, 2014.

Notification Concerning Transmittal of International Search Report, International Application No. PCT/US2013/044339, International Filing Date Jun. 5, 2013, entitled "Biobased Rubber Modified BioDegradable Polymer Blends", dated Aug. 1, 2013.

Notification Concerning Transmittal of International Preliminary Report on Patentability, International Application No. PCT/US2013/044367, International Filing Date Jun. 5, 2013, entitled "Low Glass Transition Polyhydroxyalkanoates for Modification of Biodegradable Polymers", dated Dec. 18, 2014.

Notification Concerning Transmittal of International Search Report, International Application No. PCT/US2013/044367, International Filing Date Jun. 5, 2013, entitled "Low Glass Transition Polyhydroxyalkanoates for Modification of Biodegradable Polymers", dated Aug. 5, 2013.

(56) References Cited

OTHER PUBLICATIONS

Office Communication, U.S. Appl. No. 13/698,229, entitled "Toughening Polylactic Acid With Polyhydroxyalkanoates", dated Mar. 27, 2015.
Final Office Action for U.S. Appl. No. 13/698,229, "Toughening Polylactic Acid With Polyhydroxyalkanoates," dated Sep. 11, 2015.
Final Office Action for U.S. Appl. No. 14/702,437, "PHA Compositions Comprising PBS and PBSA and Methods for Their Production," dated Jun. 17, 2016.
Non-Final Office Action for U.S. Appl. No. 13/380,444, "Branched Aliphatic-Aromatic Polyester Blends," dated Jun. 24, 2014.
Non-Final Office Action for U.S. Appl. No. 13/698,229, "Toughening Polylactic Acid With Polyhydroxyalkanoates," dated Mar. 27, 2015.
Non-Final Office Action for U.S. Appl. No. 14/150,451, "PHA Compositions Comprising PBS and PBSA and Methods for Their Production," dated Sep. 2, 2014.
Non-Final Office Action for U.S. Appl. No. 14/702,437, "PHA Compositions Comprising PBS and PBSA and Methods for Their Production," dated Nov. 30, 2015.
Notice of Allowance and Fees Due, U.S. Appl. No. 13/959,715, dated Sep. 10, 2013.
Notice of Allowance for U.S. Appl. No. 13/380,483, "PHA Compositions Comprising PBS and PBSA and Methods for Their Production," dated May 3, 2013.
Notice of Allowance for U.S. Appl. No. 13/698,229, "Toughening Polylactic Acid With Polyhydroxyalkanoates," dated Dec. 24, 2015.
Notice of Allowance for U.S. Appl. No. 14/150,451, "PHA Compositions Comprising PBS and PBSA and Methods for Their Production," dated Feb. 12, 2015.
Notice of Allowance for U.S. Appl. No. 14/406,135, "Low Glass Transition Polyhydroxyalkanoates for Modification of Biodegradable Polymers," dated Feb. 1, 2016.
Notice of Allowance for U.S. Appl. No. 14/406,135, "Low Glass Transition Polyhydroxyalkanoates for Modification of Biodegradable Polymers," dated Nov. 10, 2015.
Notice of Allowance for U.S. Appl. No. 14/702,437, "PHA Compositions Comprising PBS and PBSA and Methods for Their Production," dated Jun. 17, 2016.
D'Haene et al., "Preparation and Characterization of a Branched Bacterial Polyester", Macromolecules, ACS 32(16): 5229-5235 (1999).
International Preliminary Report on Patentability for International Application No. PCT/US2015/023186 dated Sep. 27, 2016.
International Search Report and Written Opinion for International Application No. PCT/US2015/023186 dated Jul. 1, 2015.
International Search Report for Int'l Application No. PCT/US2010/040037; dated Feb. 1, 2011.
International Search Report for Int'l Application No. PCT/US2010/040056; dated Feb. 1, 2011.
Notification Concerning Transmittal of International Preliminary Report on Patentability for International Application No. PCT/US2010/040056, dated Jan. 12, 2012.
Notification Concerning Transmittal of International Preliminary Report on Patentability, International Application No. PCT/US2010/040037. dated Jan. 12, 2012.
Patent Examination Report No. 1, Australian Patent Application No. 2010265939; dated Sep. 27, 2012.
Saravanan D, et al., "Synthesis and characterization of cross linked chitin/bentonite polymer blend and absorption studies of Cu (II) and Cr (VI) on chitin," Scholars Research Library Der Pharma Chemica, 3(6): 406-424 (2011).
Wiebking, "Increasing the Flexural Modulus of Rigid PVC at Elevated Temperatures," J Vinyl Addit Techn, 12: 37-40 (2006).
Written Opinion for International Application No. PCT/Us10/040037 dated Feb. 1, 2011.
Written Opinion for International Application No. PCT/US13/044339 dated Aug. 1, 2013.
Written Opinion for International Application No. PCT/US2011/036808 dated Jan. 18, 2012.
Written Opinion of The International Searching Authority for International Application No. PCT/US2010/040056, dated Feb. 1, 2012.

* cited by examiner

BIOBASED RUBBER MODIFIED BIODEGRADABLE POLYMER BLENDS

RELATED APPLICATIONS

This application is the U.S. National Stage of International Application No. PCT/US2013/044339, filed Jun. 5, 2013, which designates the U.S., published in English, and claims the benefit of U.S. Provisional Application No. 61/655,983 filed on Jun. 5, 2012 and U.S. Provisional Application No. 61/788,090 filed Mar. 15, 2013. The entire teachings of the above applications are incorporated herein by reference.

BACKGROUND OF THE INVENTION

Production of plastics derived from renewable resources is expected to grow to 3.45 million tons by the year 2020, representing a current annual growth rate of approximately 37% for biobased plastics (Plastics Engineering, February 2010, p 16-19). The drivers for growth of biobased plastics include the contribution to global warming from production of petroleum-based plastics, the need to reduce our dependence on limited supplies of petroleum oil, the fluctuating petroleum oil prices as well as environmental disposal problems of common petroleum-based plastics. One objective for manufacturing biobased plastics is to replace as much "fossil" or petroleum-derived carbon with "renewable" carbon in the material as possible. Another objective of biodegradable or compostable bioplastics is to provide alternative end of life options and to develop new applications where degradation provides new performance attributes such as for compostable bags used to transfer food waste to composting or anaerobic digestion facilities or biodegradable mulch films, plastic articles for shoreline restoration, plastic articles for oil or gas production and the like. This invention is generally in the area of biodegradable biobased plastics and we use the term biodegradable and compostable interchangeably. The percentage of "renewable" carbon can be qualitatively measured in polymer materials using $^{14}C$ radio carbon dating (ASTM D6866 test method). In an ideal situation the biodegradable bioplastics are fully biobased or have a high, say greater than 50% biobased carbon content, preferably greater than 60%, 70%, 80% up to greater than 98% biobased content. This provides additional marketing advantages of interest to consumers who prefer that biodegradable plastics are based as much as possible on renewable resources. The percentage of "renewable" carbon can be qualitatively measured in polymer materials using $^{14}C$ radio carbon dating (ASTM D6866 test method).

Current examples of biobased biodegradable plastics produced from renewable resources include polylactic acid (PLA) made from lactic acid produced by fermentation of sugar (Nature Works Ingeo™ PLA), polyhydroxyalkanoates (PHA's) produced by the fermentation of glucose (U.S. Pat. Nos. 6,593,116 and 6,913,911 as well as US Patent Pub. No. 2010/0168481) and thermoplastic starch derived from plants such as potato, corn and tapioca.

To optimize the performance properties of biodegradable plastics it is advantageous to blend biobased plastics together. Mechanical properties such as tensile strength, puncture resistance, elongation; thermal properties such as heat distortion temperature and optical properties such as clarity are all important for packaging film applications and therefore require biobased polymers that are both tough and readily processable.

PLA is the most advanced biobased biodegradable plastic in the industry in terms of market penetration and is used in numerous applications including thermoforming, injection molding and coatings. The use of PLA in film applications had been severely limited by the extremely poor physical properties of the films produced to date which are brittle and have very poor strength, tear or puncture resistance. For example the level of PLA that can be blended into the synthetic biodegradable polymer ECOFLEX® produced by BASF is limited to around 15% of the total weight of PLA that can be used due to impairment of film properties. It is one embodiment of the current invention to provide compositions and methods for producing PLA films, in which PLA is the majority component by weight of the biodegradable polymer in the film, usually greater than 65% and PHA is a minority component. Quite unexpectedly these films have been found to have exceptionally good film properties as compared to any other PLA dominated film composition reported to date.

Polyhydroxyalkanoates are unique materials to use as components in biobased biodegradable plastic blends because they are easily blended with many other biodegradable plastics, they can be manufactured as 100% biobased materials and they biodegradable in a number of different environments (water, soil, compost). Genetically-modified biomass systems have recently been developed which produce a wide variety of biodegradable PHA polymers and copolymers with material properties ranging from very hard and brittle to rubber-like elasticity (Lee (1996), *Biotechnology & Bioengineering* 49:1-14; Braunegg et al. (1998), *J. Biotechnology* 65:127-161; Madison, L. L. and Huisman, G. W. (1999), Metabolic Engineering of Poly-3-Hydroxyalkanoates; From DNA to Plastic, in: *Microbiol. Mol. Biol. Rev.* 63:21-53).

Blends of PHA's with other biodegradable plastics have been investigated previously such as blends of PLA with poly-3-hydroxybutrate (P3HB), poly-3-hydroxybutyrate-co-hydroxyvalerate (PHBV) (J. S. Yoon, W. S. Lee, K. S. Kim, I. J. Chin, M. N. Kim and C. Kim, *European Polymer Journal*, 36, 435 (2000); B. M. P. Ferreira, C. A. C. Zavaglia and E. A. R. Duek, *Journal of Applied Polymer Science*, 86, 2898 (2002)), poly-3-hydroxybutyrate-co-3-hydroxyhexanoate (P3HB-3HH) (I. Noda, M. M. Satkowski, A. E. Dowrey and C. Marcott, *Macromolecular Bioscience*, 4, 269 (2004)) and poly-3-hydroxybutyrate-4-hydroxybutyrate (P3HB-co-4HB) ternary blends (International Pub. No. WO2011/146484); blends of PBS and PBSA with P3HB-co-4HB (International Pub. WO2010/151798); blends of P3HB-co-4HB with polybutylene-adipate-terephthalate (PBAT) (US Pub. No 2011/0189414) and blends of P3HB-co-4HB with polyvinyl acetate (PVAc) (International Pub. No 2011/031558). Producing PHA copolymers industrially with the desirable properties for producing PLA blends suitable for producing robust products remains an unmet need in the industry. While the above blends showed basic mechanical properties and a range of biodegradation rates, the biobased content of these blends was not 100% and film products made using these blends had inadequate physical properties for film applications which require good tear strength, puncture resistance and toughness Therefore, a need exists for producing biobased plastic blends with improved material properties that are biodegradable and have increased, up to 100% biobased content.

SUMMARY OF THE INVENTION

Described herein are biodegradable polymer blend compositions of a biobased PHA copolymer which can have a renewable carbon content of at least 80% by weight (e.g., 80%, 85%, 90%, 95%, 98%, 99%, 100%) and another biodegradable polymer, PLA having a renewable carbon content of 10% to 100% by weight preferably 80 to 100% by weight. The blend compositions have greater than 60% PLA content by weight of the total biodegradable polymer in the blend, preferably in the range 65% to 95% by weight in the blend. The PHA copolymer is a copolymer of 3-hydroxybutyric acid and one or monomers selected from the group comprising 4-hydroxybutyrate, 5-hydroxyvalerate, 3-hydroxyhexanoate and 3-hydroxyoctanoate. In certain embodiments, the copolymers are poly-3-hydroxybutyrate-co-4-hydroxybutyrate and poly-3-hydroxybutyrate-co-5-hydroxyvalerate copolymers. The content of the comonomer in the PHA copolymer is selected such that the copolymer has a low glass transition temperature Tg and low degree of crystallinity. Such copolymers usually have a comonomer content of at least 25% by weight of the total monomers in the copolymer. In certain aspects, in the range of 25-75% by weight. High levels of comonomer are required to depress Tg and to reduce crystallinity. In general, PHA copolymers of the type described above have been produced at laboratory scale and it is known in the art that the trend is for the molecular weight of the PHA copolymer to be reduced significantly with increasing comonomer content. Copolymers having greater than 25% by weight comonomer typically have molecular weights less than 500,000 daltons. It is also known in the art that producing these types of copolymers by fermentation processes, in particular copolymer with 4-hydroxybutyrate and 5-hydroxyvalerate is very limited at industrial scale due to the toxicity of the non-biobased co-feeds 1,4-butanediol and 1,5-pentanediol currently used as the precursor for these comonomers. These co-feeds also add prohibitive levels of additional costs in the production process making this approach not economic. To date the highest PHA copolymer containing 4-hydroxybutyrate as the second comonomer produced industrially had only up to 30% 4-hydroxybutyrate content (see world wide web at mirelbioplastics.com). Recent technologies have described successful production of PHA copolymers having much higher comonomer content (23.5% to 75% by weight) and 100% biobased content. By selecting PHA copolymers with high comonomer content and high molecular weight (greater than 500,000 daltons) we have unexpectedly found that these blend compositions have surprisingly improved properties of improved tensile toughness, melt elasticity, melt strength and pliability. Additionally, these blend compositions when made into film, laminates or other thin layered articles, do not have the undesirable property of making noise when manipulated or handled.

In a first aspect, a branched biodegradable composition includes a polymer blend of a biobased polylactic acid and a biobased copolymer of 3-hydroxybutyrate wherein one or more comonomers can include 4-hydroxybutyrate, 5-hydroxyvalerate, 3-hydroxyhexanoate or 3-hydroxyoctanoate. The comonomers can be incorporated at about 25 weight % to about 85 weight % of the copolymer. The polymer blend can have a glass transition temperature of about −5° C. to about −50° C., and the renewable carbon content of the biodegradable blend can be at least 80% by weight of the composition. For example, a branched biodegradable composition includes a polymer blend of a biobased PHA copolymer poly-3-hydroxybutyrate-co-4-hydroxybutyrate copolymer having about 25 weight % to about 75 weight % 4-hydroxybutyrate having a glass transition temperature of about −5° C. to about −50° C. and a biobased PLA polymer, the renewable carbon content of the biodegradable blend is at least 80% by weight of the composition. The composition can also include one or more additives, for example, a nucleating agent and/or plasticizer.

In a second aspect, a branched biodegradable composition includes a polymer blend of a polylactic acid and a biobased copolymer of 3-hydroxybutyrate wherein one or more comonomers can include 4-hydroxybutyrate, 5-hydroxyvalerate, 3-hydroxyhexanoate or 3-hydroxyoctanoate. The comonomers can be incorporated at about 25 weight % to about 85 weight % of the copolymer. The biobased copolymer can have a glass transition temperature of about −5° C. to about −50° C. The biobased copolymer can also include a plasticizer in an amount sufficient to increase the biodegradation rate of the composition. The renewable carbon content of the biodegradable blend can be at least 80% by weight of the composition. In certain embodiments, the compositions include a plasticizer which is selected from CITROFLEX® A4 plasticizer, PLASTIHALL® P643 plasticizer, PARAPLEX® 8654 plasticizer and PARAPLEX® A8600 plasticizer or combination thereof. For example, a composition is described of a branched biodegradable composition including a polymer blend of a biobased polymer, a biobased poly-3-hydroxybutyrate-co-4-hydroxybutyrate copolymer having about 25 weight % to about 75 weight % 4-hydroxybutyrate of the copolymer in the composition and a glass transition temperature of about −5° C. to about −50° C., and a plasticizer in an amount sufficient to increase the biodegradation rate of the composition and wherein the renewable carbon content of the biodegradable blend is at least 80% by weight of the composition. In certain embodiments, the compositions include a plasticizer selected from CITROFLEX® A4 plasticizer, PLASTIHALL® P643, PARAPLEX® 8654 and PARAPLEX® A8600 plasticizer or combination thereof.

In certain embodiments of the first aspect, the poly-3-hydroxybutyrate-co-4-hydroxybutyrate copolymer has about a 25 weight % to about 75 weight % 4-hydroxybutyrate of the copolymer composition, about 31 weight % to about 75 weight percent, about 31% to about 65%, about 25% to about 35% weight percent, about 25% to about 30% weight percent, about 45% to about 75% or about 25% to about 50%.

In a second embodiment of the first aspect of the invention, the poly-3-hydroxybutyrate-co-4-hydroxybutyrate copolymer has a molecular weight of about 500,000 to about 2,000,000 g/mole (Daltons) or about 1,000,000 to about 1,750,000 g/mole (Daltons).

In a third embodiment, including other embodiments and aspects of the invention, the weight percent of the 3-hydroxybutyrate copolymer in the blend is between about 5 to about 95% by weight, about 35% to about 75% by weight, about 35% to about 65% by weight, or about 40% to about 50% by weight of the total composition.

In a fourth embodiment of any of the aspects and embodiments of the invention, the composition of the biodegradable blend includes two phases, wherein the phases can be continuous or co-continuous.

In a third aspect of the invention, the renewable carbon content of the biodegradable blend can be a least 10% by weight of the composition, at least 20% by weight of the composition, at least 30% by weight of the composition, at least 40% by weight of the composition, at least 50% by weight of the composition, at least 60% by weight of the composition, at least 70% by weight of the composition, at least 80% by weight of the composition, at least 85% by weight of the composition, at least 90% by weight of the composition, at least 95% by weight of the composition, at least 97% by weight of the composition, at least 98% by weight of the composition, at least 99% by weight of the composition or at least 100% by weight of the composition.

In the embodiments and aspects of the invention, the renewable carbon content of the 3-hydroxybutyrate copolymer can be at least 85% by weight of the copolymer, at least 90% by weight of the copolymer, at least 95% by weight of the copolymer, at least 97% by weight of the copolymer, at least 98% by weight of the copolymer, at least 99% by weight of the copolymer, at 100% by weight of the copolymer.

In a fourth aspect of the invention, the composition further includes one or more of the following: polylactic acid or other polyhydroxyalkanoates such as poly-3-hydroxybutyrate-co-5-hydroxyvalerate (P3HB-5HV), poly-3-hydroxybutyrate-co-3-hydroxyhexanoate (P3HB-3HH), poly-3-hydroxybutyrate-co-3-hydroxyoctanoate (P3HB-3HO).

In a fifth aspect of the invention, the composition is optically clear without the addition of additives.

In a sixth aspect of the invention, the branched composition is formed by reactive blending with a branching agent, for example dicumyl peroxide, t-amyl-2-ethylhexyl peroxycarbonate, 1,1-bis(t-butylperoxy)-3,3,5-trimethylcyclohexane, 2,5-dimethyl-2,5-di(t-butylperoxy) hexane, 2,5-dimethyl-2,5-di(t-amyl peroxy) hexane, 2,5-bis(t-butylperoxy)-2,5-dimethylhexane, 2,5-dimethyl-di(t-butylperoxy)hexyne-3, di-t-butyl peroxide, benzoyl peroxide, di-t-amyl peroxide, t-butyl cumyl peroxide, n-butyl-4,4-bis(t-butylperoxy)valerate, 1,1-di(t-butylperoxy)-3,3,5-trimethyl-cyclohexane, 1,1-di(t-butylperoxy)cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy)propane, ethyl-3,3-di(t-amylperoxy)butyrate, t-butylperoxy-acetate, t-amylperoxyacetate, t-butylperoxybenzoate, t-amylperoxybenzoate, and di-t-butyl-diperoxyphthalate or combinations thereof at a concentration of about 0.001% to about 0.5% by weight of the blend composition. In certain embodiments, a co-agent for reacting with the polymer blend composition is included, for example, diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl)phosphate, or combinations thereof, a epoxy-functional styrene-acrylic polymer, an epoxy-functional acrylic copolymer, an epoxy-functional polyolefin copolymer, an oligomer comprising a glycidyl group with an epoxy functional side chain, an epoxy-functional poly(ethylene-glycidyl methacrylate-co-methacrylate), or an epoxidized oil or combinations thereof. The composition of any of the aspects or embodiments, further includes a nucleating agent selected from one or more of the following carbon black, cyanuric acid, uracil, thymine, mica talc, silica, boron nitride, barium nitride, clay, calcium carbonate, synthesized silicic acid and salts, metal salts of organophosphates, and kaolin or combination thereof.

In a seventh embodiment of any of the aspects of the invention, the 3-hydroxybutyrate copolymer includes an amorphous rubber phase having no melting point.

In a seventh aspect of the invention, the composition further includes one or more additives, for example, one or more selected from plasticizers, clarifiers, nucleating agents, thermal or oxidative stabilizers, inorganic fillers, anti-slip agents, compatibilizers (e.g., maleic anhydride), blocking agents or a combination thereof or a dendritic or hyper-branched polyester.

In an eighth aspect of the invention, the composition has continuous or co-continuous phases.

In a ninth aspect of the invention, a branched biodegradable polymer compositions can include a blend of polylactic acid (PLA) and a biodegradable polyhydroxyalkanoate (PHA) polymer. The biodegradable PHA polymer can have a glass transition temperature (Tg) of between about −5° C. and about −50° C. and a molecular weight of between about 450,000 Daltons and about 1,500,000 Daltons. The PHA can be a copolymer of 3-hydroxybutyrate one or more monomers selected from 4-hydroxybutyrate, 5-hydroxyvalerate, 3-hydroxyhexanoate and 3-hydroxyoctanoate. The monomers can be present at between about 25% and about 85% of the weight of the PHA polymer. The PHA polymer can be between about 3% and about 40% of the weight of the branched biodegradable polymer compositions.

In a tenth aspect of the invention, branched biodegradable polymer compositions can include a blend of polylactic acid and a biodegradable polyhydroxyalkanoate (PHA) polymer of poly-3-hydroxybutyrate-co-4-hydroxybutyrate. The biodegradable PHA polymer can have a glass transition temperature (Tg) of between about −5° C. and about −50° C. and a molecular weight of between about 450,000 Daltons and about 1,500,000 Daltons. The 4-hydroxybutyrate can be present at between about 25% and about 85% of the total weight of the PHA copolymer. The PHA polymer can be between about 3% and about 40% of the weight of the branched biodegradable polymer compositions.

In an eleventh aspect of the invention, branched biodegradable polymer compositions can include a blend of polylactic acid and a biodegradable polyhydroxyalkanoate (PHA) polymer of poly-3-hydroxybutyrate-co-5-hydroxyvalerate. The biodegradable PHA polymer can have a glass transition temperature (Tg) of between about −5° C. and about −50° C. and a molecular weight of between about 450,000 Daltons and about 1,500,000 Daltons. The 5-hydroxyvalerate can be present at between about 25% and about 85% of the total weight of the PHA copolymer. The PHA polymer can be between about 3% and about 40% of the weight of the branched biodegradable polymer compositions.

In a twelfth aspect of the invention, branched biodegradable polymer compositions can include a blend of polylactic acid and a biodegradable polyhydroxyalkanoate (PHA) polymer of poly-3-hydroxybutyrate-co-3-hydroxyhexanoate. The biodegradable PHA polymer can have a glass transition temperature (Tg) of between about −5° C. and about −50° C. and a molecular weight of between about 450,000 Daltons and about 1,500,000 Daltons. The 3-hydroxyhexanoate can be present at between about 25% and about 85% of the total weight of the PHA copolymer. The PHA polymer can be between about 3% and about 40% of the weight of the branched biodegradable polymer compositions.

In a thirteenth aspect of the invention, branched biodegradable polymer compositions can include a blend of polylactic acid and a biodegradable polyhydroxyalkanoate (PHA) polymer of poly-3-hydroxybutyrate-co-3-hydroxyoctanoate. The biodegradable PHA polymer can have a glass transition temperature (Tg) of between about −5° C. and about −50° C. and a molecular weight of between about 450,000 Daltons and about 1,500,000 Daltons. The 3-hydroxyoctanoate can be present at between about 25% and about 85% of the total weight of the PHA copolymer. The PHA polymer can be between about 3% and about 40% of the weight of the branched biodegradable polymer compositions.

The compositions of the invention can be produced to resins, pellets, finished articles, films or multilayer laminates including at least one film layer having the composition of the invention, for example a film having a thickness of about 1 to about 2 microns.

Articles made with the laminate and articles such as foam woven and nonwoven fibers or a thermoformed part of the invention are also contemplated.

Also included is a biobased copolymer of 3-hydroxybutyrate and one or more comonomers selected from 4-hydroxybutyrate, 5-hydroxyvalerate, 3-hydroxyhexanoate and 3-hydroxyoctanoate prepared by culturing a recombinant host with a renewable feedstock to produce a biobased 3-hydroxybutyrate copolymer biomass for use in the compositions of the invention described above. The source of the renewable feedstock is selected from glucose, fructose, sucrose, arabinose, maltose, lactose, xylose, glycerol, ethanol, methanol, fatty acids, vegetable oils, and biomass derived synthesis gas or a combination thereof. The renewable carbon content of the biobased poly-3-hydroxybutyrate-co-4-hydroxybutyrate copolymer is easily determined using the method described in ASTM D6866.

The reactive blends of the invention having a total 4HB, 5HV, 3HH or 3HO content or combinations of these of at least about 25% to about 85% by weight have unexpectedly tough and soft pliable properties. Films made from the compositions described herein have desirable properties for commercial products. For example, low noise level, or optimally no noise level, when handled or manipulated compared to other biodegradable products. In other words, the films can be less crinkly. Additionally, the formulations have sufficient tear strength and toughness and are capable of being processed on a blown film line.

In other embodiments, the blend compositions are biodegradable, compostable and biobased.

In certain embodiments, the compositions of any of the aspects of the invention are made by melt reacting the polymers with a branching agent in the presence of a co-agent (also referred to herein, as a "cross-linking agent"), thereby forming a branched polymer blend. The conditions of the reaction are suitable for reacting the branching agent alone or with a cross-linking agent and a polymer blend. A "branched" polymer is a polymer with a branching of the polymer chain or cross-linking of two or more polymer chains.

The cross-linking agent when reacted, for example, at an epoxide group(s), epoxy functional compound, or double bond(s), becomes bonded to another molecule, e.g., a polymer or branched polymer. As a consequence the multiple molecules become cross-linked through the reactive group on the cross-linking agent. An "epoxy functional compound" is a cross-linking agent comprising two or more epoxy functional groups.

In certain embodiments, the functional group of the cross-linking agent is an epoxy-functional compound, for example, an epoxy-functional styrene-acrylic polymer, an epoxy-functional acrylic copolymer, an epoxy-functional polyolefin copolymer, oligomers comprising glycidyl groups with epoxy functional side chains, an epoxy-functional poly(ethylene-glycidyl methacrylate-co-methacrylate), or an epoxidized oil, poly(ethylene-co-methacrylate-coglycidyl methacrylate, ethylene-n-butyl acrylate-glycidyl methacrylate or combinations thereof.

In other embodiment, the cross-linking agent contains at least two reactive double bonds. These cross-linking agents include but are not limited to the following: diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate, or combinations thereof.

One or more additives may also be included in the compositions of any of the aspects of the invention and methods of the inventions. The types of additives include but are not limited to plasticizers, clarifiers, nucleating agents, thermal stabilizers, inorganic fillers, anti-slip agents, and anti-blocking agents. Although sometimes not needed in the blend, compatibilizers can also be added. In particular embodiments of the first and second aspect of the invention, a nucleating agent is added. In other embodiments of the first and second aspects of the invention, a nucleating agent and a compatibilizer are added, in certain of these embodiments, the nucleating agent is cyanuric acid or boron nitride and the compatibilizer is maleic anhydride.

Also disclosed is a method of making a biodegradable article including a branched 3-hydroxybutyrate copolymer wherein one or more comonomers are selected from 4-hydroxybutyrate, 5-hydroxyvalerate, 3-hydroxyhexanoate and 3-hydroxyoctanoate and polylactic acid (PLA), by melt-blending the 3-hydroxybutyrate copolymer and polylactic with a branching agent under conditions that cause melting and branching of the blend, forming a molten branched polymer composition; and forming an article from the branched molten polymer composition. The resultant article can be a tough, tear resistant biodegradable, branched polymer composition of 3-hydroxybutyrate copolymer and PLA. Articles, films and laminates comprising the compositions of the invention are also described.

DETAILED DESCRIPTION

Described herein are biodegradable polymer blend compositions of a biobased polylactic acid (PLA) and a biobased copolymer of 3-hydroxybutyrate (3HB) incorporating one or more comonomers selected from 4-hydroxybutyrate (4HB), 5-hydroxyvalerate (5HV), 3-hydroxyhexanoate (3HH) and 3-hydroxyoctanoate (3HO) having a renewable carbon content of at least 10% by weight with improved properties such as tensile toughness, tear strength, melt elasticity, melt strength and pliability.

In a first aspect, the invention pertains to branched biodegradable compositions comprising a blend of the polymer polylactic acid and a biobased 3-hydroxybutyrate copolymer comprising one or more monomers selected from 4-hydroxybutyrate, 5-hydroxyvalerate, 3-hydroxyhexanoate and 3-hydroxyoctanoate which are incorporated into the copolymer at about 25% to about 85% weight percent, impart to the copolymer a glass transition temperature of about −15° C. to about −50° C., and provide a renewable carbon content of the biodegradable blend of at least 10% by weight of the composition.

In particular, when these components are melt-blended in the presence of a branching agent, for example, organic peroxide, the resultant compositions display many unexpected synergies for the blend are observed for example in the melt rheology, thermal stability, processing and mechanical properties, such as film processing and film properties.

The toughness enhancement found was even greater in the PLA/PHA blends that were prepared using reactive melt-blending than without reactive melt-blending.

For example, this approach produced toughness values that were statistically higher than the best values as reported with PLA/polybutylene succinic acid (PBS) or polybuytylene succinic adipate (PBSA) blends in U.S. Pat. No. 5,883,199.

Pure P4HB homopolymer is a mostly amorphous, rubbery polymer at room temperature with a significantly lower glass transition temperature ($T_g$=−60° C.) than that of pure PLA ($T_g$=55-60° C.). When it is combined with 3-hydroxybutyrate in a copolymer, where the %4HB>25% by weight, the copolymer retains its rubbery properties ($T_g$=−15° C. to −50° C.). Similar rubbery behavior is observed when 3-hydroxybutyrate is combined with other comonomers such 5-hydroxyvalerate, 3-hydroxhexanoate or 3-hydroxyoctanoate. When the rubbery PHA copolymer is blended with other polymers, it readily forms a separate rubber phase which imparts a toughening effect on the overall polymer blend. Because of this property and its proven biodegradability in various environments, it is a beneficial material for improving the toughness properties of other polymers while maintaining the overall biodegradability or decomposition of the blend.

The toughness of the biodegradable blend is further improved by reactive blending. In particular, when the PLA and 3-hydroxybutyrate copolymers are reactively melt-blended in the presence of a branching agent, for example, an organic peroxide, the resultant PLA/3-hydroxybutyrate copolymer blend displays significant improvements in tensile toughness and elongation which extends the product application range of the normally brittle PLA polymer. In certain aspects, the process of reactively blending the 3-hydroxybutyrate copolymer and PLA together further includes the use of a co-agent, such as a multifunctional carboxylic acid acrylate, or a crosslinking agent, such as an epoxide-containing acrylate copolymer, resulting in further improvements in PLA polymer blend mechanical properties.

Combining (e.g., mixing or blending) the 3-hydroxybutyrate copolymer with PLA in the presence of peroxide provides the following benefits compared to combining the polymer blends or mixtures without any reactive chemistry: (1) higher tensile elongation (2) higher tensile toughness (3) improved thermal stability and/or better melt stability (4) improved tear strength and (5) improve impact strength, resulting in a broader processing window for the overall composition and subsequent applications of these compositions in production of articles, films and the like.

The invention provides branched PLA polymer/3-hydroxybutyrate copolymer compositions and methods of preparing branched blends with improved tensile toughness and elongation as well as tear and impact strength. The use of branching, cross-linking or co-agents further improves the desired properties of the polymer blend composition over the starting compositions without the cross-linking or co-agents and branching agents. In one aspect, the cross-linking agents comprise two or more reactive groups such as double bonds or epoxides. These cross-linking agents react with and become covalently bonded (connected) to the polymer. The connection of multiple chains through these cross-linking agents forms a branched polymer blend. The branched polymer blend has increased tensile toughness and elongation over the starting polymer blend.

The temperatures experienced by a polymer during processing can cause a drop in melt strength due to thermal degradation, which can in turn cause difficulties in processing the polymer(s). Increased melt strength is therefore useful in that it allows the polymers to be processed across a broader temperature range. A broader "processing window" is especially important in certain polymer applications, such as in the production of blown film (i.e., in preventing or reducing bubble collapse), or cast film extrusion, thermoformed articles (i.e., preventing or reducing sheet sag during thermoforming), profile extruded articles (i.e., preventing or reducing sag), non-woven fibers, monofilament, etc. Additionally, articles made from the compositions described herein exhibit greater tensile toughness and elongation while maintaining biodegradability. The increases in tensile toughness can be 10 to 40 fold greater. The increases in elongation can be 10 to 60 fold greater. Tensile toughness increase can be 10-20, 20-30 or 25-35 fold. Elongation increase can be 20-30, 30-40 or 45-60 fold.

Increased melt strength is useful in that it allows the polymers to be formed utilizing a broader temperature range when the polymer is processed. Typically due to the polymer's thermal instability at processing temperatures, they accordingly experience a drop in melt strength. This can cause difficulties in processing these polymers. Additionally, the improvement shown in films made from the methods and compositions described herein are greater tensile strength, tear resistance and greater puncture resistance.

The films produced by the compositions described herein can also be used to make laminates. The biodegradable laminates comprising the compositions of the invention are suitable for coating other layers such as paper to produce articles or containers. The laminate is produced for example by co-extruding a composition of the invention onto a paper layer or with another thermoplastic blend or composition. Other layers of thermoplastic polymers or additional layers of a composition of the invention can also be included or stacked to form laminates. For example, adhesive layers can also be added or other polymer layers that impart particular desired properties. For example, the blended materials or laminates can be different and improved by varying compositions to change the degree of hardness, softness, flexibility, tackiness, toughness, ductility, processability, opaqueness and the like. Additives, such as anti-blocking agents, plasticizers and the like are also contemplated.

In certain aspects, the laminate can be 1 to 15 layers, for example 2 layers, 3 layers, 4 layers or 5 layers, 6 layers, 7 layers, 8 layers, 10 layers, 11 layers, 12 layers, 13 layers, 14 layers or 15 layers. The overall size of the laminate is about 10 microns to about 100 microns, for example 10-50 microns, 20-60 microns, 25-75 microns. Each individual layer can be about 1 to about 2 microns, for example about 1 to about 5 micron, about 2 to about 4 microns, about 2 to about 5 microns. For each laminate, at least one layer is a composition of the invention, for example, the composition of the first, second, third or fourth aspect of the invention. In certain embodiments, the compositions of the invention comprise more than one layer, for example two, three, four or more.

The methods and branched compositions of the invention improve the melt strength of polymer compositions, a desirable property for many polymer product applications. Melt strength is a rheological property that can be measured a number of ways. One measure is G' where G' is the polymer storage modulus measured at melt processing temperatures.

As used herein, amorphous refers to the state of the 3-hydroxybutyrate copolymer which is not crystalline, for example, no lattice structure or long range molecular order characteristic of a crystalline state. The degree of crystallinity for the invention described herein is the fraction of the polymer that exists in an orderly state, having a lattice structure. In certain embodiments, one phase of the multiphase 3-hydroxybutyrate copolymer is between about 0 to about 5% crystallinity, for example the degree of crystallinity in percent is about 0, or is minimally observed to be less than about 1%. In a preferred embodiment, the degree of crystallinity of one phase of the multiphase 3-hydroxybutyrate copolymer polymer is below 3%, for example, below 2% or below 1% or ranges or numbers calculated between these percentages such as 2.5%. The degree of crystallinity calculated for the compositions of the invention is minimal and can be determined by various methods, for example, density calculations, x-ray and electron diffraction, differential scanning calorimetry, infrared absorption (FTIR), Raman spectroscopy and the like.

$T_g$ is the glass transition temperature or the glass-rubber transition temperature. It is defined as the temperature where the polymer chains begin coordinated molecular motions. Physically, the polymer modulus begins to drop several orders of magnitude until the polymer finally reaches a rubbery state.

Physical properties and rheological properties of polymeric materials depend on the molecular weight and distribution of the polymer. "Molecular weight" is calculated in a number of different ways. Unless otherwise indicated, "molecular weight" refers to weight average molecular weight.

"Number average molecular weight" ($M_n$) represents the arithmetic mean of the distribution, and is the sum of the products of the molecular weights of each fraction, multiplied by its mole fraction ($\Sigma N_i M_i / \Sigma N_i$).

"Weight average molecular weight" ($M_w$) is the sum of the products of the molecular weight of each fraction, multiplied by its weight fraction ($\Sigma N_i M_i^2 / \Sigma N_i M_i$). $M_w$ is generally greater than or equal to $M_n$.

The weight average molecular weight of the PHA amorphous rubber phase or the rubber phase of the multiphase PHA used in the compositions of the invention ranges between about 500,000 to about 2,000,000 Daltons as measured by light scattering and GPC with polystyrene standards. In particular embodiments molecular weight is about 550,000 or about 750,000 or about 1,500,000 Daltons.

One way of increasing the melt strength is by branching the blend polymer (PLA) with PHA and combinations thereof, and various methods for accomplishing this are described herein. Branching of PLA and PHAs is a result of reacting the polymers with branching agents, for example, peroxides. Also, cross-linking agents, for example, reactive compounds (compounds with epoxy groups and compounds with reactive double bonds) that enhance or increase the branching of the polymer can also be used.

Addition of other reactive polymeric compounds, such as reactive acrylics or dendritic hydroxyls can also be employed to generate and modify the branching architecture of the PHA blends. The use and selection of additives to these compositions result in improved properties. All of these methods are described herein.

The invention provides biodegradable, branched and unbranched PHA copolymer blend compositions that do not require the use of a compatibilizer for mixing and blending that other PLA/thermoplastic polymer compositions require. In these other compositions the compatibilizer is necessary to improve the properties of the blends and increase the compatibility of the polymer composition, especially immiscible polymers.

Polylactic Acid (PLA)

In the compositions and methods described herein, polylactic acid (PLA) may be combined with 3-hydroxybutyrate (3HB) and 4-hydroxybutyrate (4HB) copolymer. Polylactic acid is a biobased, biodegradable, thermoplastic polyester that is currently being produced on a large scale for commercial applications ranging from nonwoven fibers to packaging films. Production of PLA is usually carried out by bacterial fermentation of corn sugar (dextrose) whereby the sugar is first converted into lactic acid. The lactic acid through a series of synthetic reactions is then polymerized, using tin-based catalysts, to polylactic acid. Depending on the type of catalyst employed in the synthesis, either L or D-polylactic acids (PLLA or PLDA) can be obtained. PLLA is 37% crystalline with a $T_g$~50-60° C. and a $T_m$~173-178° C. The mechanical properties of PLLA are reported as being similar to PETE. The abbreviation PLA usually refers to the PLLA structural form. When PLLA and PLDA are mixed together, they can form eutectoid stereo complexes with enhanced properties (50° C. higher $T_m$) than either PLLA or PDLA. These are being investigated as biodegradable materials for high temperature applications.

The biodegradability of PLA has been found mainly to occur through the hydrolysis of the polyester functional groups present in PLA. The degradation is essentially a two-step process whereby the PLA is first decomposed under high humidity and temperature (industrial/municipal-type composting) to produce lower molecular weight chains or lactic monomer. The second step is consumption of the low molecular weight PLA and lactic acid by microbes present in nature.

Several companies currently are manufacturing PLA from sugar feed sources. These include NatureWorks (US), Galactic (Belgium), Hycail (Netherlands), Toyota (Japan). NatureWorks, a joint venture between Cargill and Teijin operating since 2003, is currently the largest commercial producer of PLA resin.

The one drawback to processing of PLA into various products is that it is an extremely brittle material. Therefore it must be blended with other polymers in order to widen its processing window during forming. One potential problem with this approach is that additives to the PLA also have an affect on its biodegradability. The additive which has had the most success aiding in processing of PLA without adversely affecting its biodegradability is polybutylene-succinate (PBS) or polybutylene-succinate-adipate (PBSA). Both PBS and PBSA are biodegradable aliphatic polyesters. Adding high molecular weight, extrusion grade PBSA (BIONOLLE® 3001 from Showa Highpolymer Co. Ltd, Japan) to PLA has resulted in the best noted improvements in overall toughness (see, e.g., U.S. Pat. No. 5,883,199, which is incorporated by reference herein in its entirety). A PLA/PBSA 70/30 blend showed an approximately 50-fold increase in tensile elongation to break and an approximately 25-fold increase in tensile toughness relative to PLA. While adding PBSA to PLA does not compromise the compostability of PLA, it dilutes the biobased content as PBS and PBSA are currently based on non-renewable petroleum feedstocks.

Polyhydroxyalkanoates (PHAs) are a unique solution to these problems as they are biobased, biodegradable and are readily blendable with PLA. As disclosed herein, the addition of a rubbery ($T_g$ about −15° C. to about −40° C.) for example, poly-4-hydroxybutyrate PHA to PLA, followed by reactive blending, improves the tensile toughness and elongation beyond that of the PLA/PBS or PLA/PBSA blends.

Polyhydroxyalkanoates (PHAs)

Polyhydroxyalkanoates can also be combined with the 3-hydroxybutyrate (3HB) and 4-hydroxybutyrate (4HB) copolymer and other polymers in the compositions and methods of the invention. PHAs are biological polyesters synthesized by a broad range of natural and genetically engineered bacteria as well as genetically engineered plant crops (Braunegg et al., (1998), *J. Biotechnology* 65:127-161; Madison and Huisman, 1999, *Microbiology and Molecular Biology Reviews*, 63:21-53; Poirier, 2002, *Progress in Lipid Research* 41:131-155). These polymers are biodegradable thermoplastic materials, produced from renewable resources, with the potential for use in a broad range of industrial applications (Williams & Peoples, *CHEMTECH* 26:38-44 (1996)).

Useful microbial strains for producing PHAs, include *Alcaligenes eutrophus* (renamed as *Ralstonia eutropha*), *Alcaligenes latus, Azotobacter, Aeromonas, Comamonas, Pseudomonads*, and genetically engineered organisms including genetically engineered microbes such as *Pseudomonas, Ralstonia* and *Escherichia coli*.

In general, a PHA is formed by enzymatic polymerization of one or more monomer units inside a living cell. Over 100 different types of monomers have been incorporated into the PHA polymers (Steinbüchel and Valentin, 1995, *FEMS Microbiol. Lett.* 128:219-228. Examples of monomer units incorporated in PHAs for this invention include 2-hydroxybutyrate, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HH), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center. For compositions included herein, the PHA composition does not include poly(lactic acid).

In some embodiments, the PHA in the methods described herein is a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as P3HB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)).

In certain embodiments, the starting PHA can be a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as P3HB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV).

By selecting the monomer types and controlling the ratios of the monomer units in a given PHA copolymer a wide range of material properties can be achieved. Although examples of PHA copolymers having two different monomer units have been provided, the PHA can have more than two different monomer units (e.g., three different monomer units, four different monomer units, five different monomer units, six different monomer units) An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably 85% by weight of the total monomers, most preferably greater than 90% by weight of the total monomers for example 92%, 93%, 94%, 95%, 96% by weight of the copolymer and the HX comprises one or more monomers selected from 3HH, 3HO, 3HD, 3HDd.

The homopolymer (where all monomer units are identical) P3HB and 3-hydroxybutyrate copolymers (P3HB3HP, P3HB4HB, P3HB3HV, P3HB4HV, P3HB5HV, P3HB3HHP, hereinafter referred to as PHB copolymers) containing 3-hydroxybutyrate and at least one other monomer are of particular interest for commercial production and applications. It is useful to describe these copolymers by reference to their material properties as follows. Type 1 PHB copolymers typically have a glass transition temperature (Tg) in the range of 6° C. to −10° C., and a melting temperature $T_M$ of between 80° C. to 180° C. Type 2 PHB copolymers typically have a Tg of −20° C. to −50° C. and Tm of 55° C. to 90° C. In particular embodiments, the Type 2 copolymer has a phase component with a $T_g$ of −15° C. to −45° C. and no Tm.

Preferred Type 1 PHB copolymers have two monomer units have a majority of their monomer units being 3-hydroxybutyrate monomer by weight in the copolymer, for example, greater than 78% 3-hydroxybutyrate monomer. Preferred PHB copolymers for this invention are biologically produced from renewable resources and are selected from the following group of PHB copolymers:

PHB3HV is a Type 1 PHB copolymer where the 3HV content is in the range of 3% to 22% by weight of the polymer and preferably in the range of 4% to 15% by weight of the copolymer for example: 4% 3HV; 5% 3HV; 6% 3HV; 7% 3HV; 8% 3HV; 9% 3HV; 10% 3HV; 11% 3HV; 12% 3HV; 13% 3HV; 14% 3HV; 15% 3HV;

PHB3HP is a Type 1 PHB copolymer where the 3HP content is in the range of 3% to 15% by weight of the copolymer and preferably in the range of 4% to 15% by weight of the copolymer for example: 4% 3HP; 5% 3HP; 6% 3HP; 7% 3HP; 8% 3HP; 9% 3HP; 10% 3HP; 11% 3HP; 12% 3HP. 13% 3HP; 14% 3HP; 15% 3HP.

PHB4HB is a Type 1 PHB copolymer where the 4HB content is in the range of 3% to 15% by weight of the copolymer and preferably in the range of 4% to 15% by weight of the copolymer for example: 4% 4HB; 5% 4HB; 6% 4HB; 7% 4HB; 8% 4HB; 9% 4HB; 10% 4HB; 11% 4HB; 12% 4HB; 13% 4HB; 14% 4HB; 15% 4HV.

PHB4HV is a Type 1 PHB copolymer where the 4HV content is in the range of 3% to 15% by weight of the copolymer and preferably in the range of 4% to 15% by weight of the copolymer for example: 4% 4HV; 5% 4HV; 6% 4HV; 7% 4HV; 8% 4HV; 9% 4HV; 10% 4HV; 11% 4HV; 12% 4HV; 13% 4HV; 14% 4HV; 15% 4HV.

PHB5HV is a Type 1 PHB copolymer where the 5HV content is in the range of 3% to 15% by weight of the copolymer and preferably in the range of 4% to 15% by weight of the copolymer for example: 4% 5HV; 5% 5HV; 6% 5HV; 7% 5HV; 8% 5HV; 9% 5HV; 10% 5HV; 11% 5HV; 12% 5HV; 13% 5HV; 14% 5HV; 15% 5HV.

PHB3HH is a Type 1 PHB copolymer where the 3HH content is in the range of 3% to 15% by weight of the copolymer and preferably in the range of 4% to 15% by weight of the copolymer for example: 4% 3HH; 5% 3HH; 6% 3HH; 7% 3HH; 8% 3HH; 9% 3HH; 10% 3HH; 11% 3HH; 12% 3HH; 13% 3HH; 14% 3HH; 15% 3HH;

PHB3HX is a Type 1 PHB copolymer where the 3HX content is comprised of 2 or more monomers selected from 3HH, 3HO, 3HD and 3HDd and the 3HX content is in the range of 3% to 12% by weight of the copolymer and preferably in the range of 4% to 10% by weight of the copolymer for example: 4% 3HX; 5% 3HX; 6% 3HX; 7% 3HX; 8% 3HX; 9% 3HX; 10% 3HX by weight of the copolymer.

Type 2 PHB copolymers have a 3HB content of between 80% and 5% by weight of the copolymer, for example 80%, 75%, 70%, 65%, 60%, 55%, 50%, 45%, 40%, 35%, 30%, 25%, 20%, 15%, 10%, 5% by weight of the copolymer.

PHB4HB is a Type 2 PHB copolymer where the 4HB content is in the range of 20% to 60% by weight of the copolymer and preferably in the range of 25% to 50% by weight of the copolymer for example: 25% 4HB; 30% 4HB; 35% 4HB; 40% 4HB; 45% 4HB; 50% 4HB by weight of the copolymer.

PHB5HV is a Type 2 PHB copolymer where the 5HV content is in the range of 20% to 60% by weight of the copolymer and preferably in the range of 25% to 50% by weight of the copolymer for example: 25% 5HV; 30% 5HV; 35% 5HV; 40% 5HV; 45% 5HV; 50% 5HV by weight of the copolymer.

PHB3HH is a Type 2 PHB copolymer where the 3HH is in the range of 35% to 95% by weight of the copolymer and preferably in the range of 40% to 80% by weight of the copolymer for example: 40% 3HH; 45% 3HH; 50% 3HH; 55% 3HH, 60% 3HH; 65% 3HH; 70% 3HH; 75% 3HH; 80% 3HH by weight of the copolymer.

PHB3HX is a Type 2 PHB copolymer where the 3HX content is comprised of 2 or more monomers selected from 3HH, 3HO, 3HD and 3HDd and the 3HX content is in the range of 30% to 95% by weight of the copolymer and preferably in the range of 35% to 90% by weight of the copolymer for example: 35% 3HX; 40% 3HX; 45% 3HX; 50% 3HX; 55% 3HX 60% 3HX; 65% 3HX; 70% 3HX; 75% 3HX; 80% 3HX; 85% 3HX; 90% 3HX by weight of the copolymer.

PHAs for use in the methods, compositions and pellets described in this invention are selected from: PHB or a Type 1 PHB copolymer; a PHA blend of PHB with a Type 1 PHB copolymer where the PHB content by weight of PHA in the PHA blend is in the range of 5% to 95% by weight of the PHA in the PHA blend; a PHA blend of PHB with a Type 2 PHB copolymer where the PHB content by weight of the PHA in the PHA blend is in the range of 5% to 95% by weight of the PHA in the PHA blend; a PHA blend of a Type 1 PHB copolymer with a different Type 1 PHB copolymer and where the content of the first Type 1 PHB copolymer is in the range of 5% to 95% by weight of the PHA in the PHA blend; a PHA blend of a Type 1 PHB copolymer with a Type 2 PHA copolymer where the content of the Type 1 PHB copolymer is in the range of 30% to 95% by weight of the PHA in the PHA blend; a PHA blend of PHB with a Type 1 PHB copolymer and a Type 2 PHB copolymer where the PHB content is in the range of 10% to 90% by weight of the PHA in the PHA blend, where the Type 1 PHB copolymer content is in the range of 5% to 90% by weight of the PHA in the PHA blend and where the Type 2 PHB copolymer content is in the range of 5% to 90% by weight of the PHA in the PHA blend.

The PHA blend of PHB with a Type 1 PHB copolymer is a blend of PHB with PHB3HP where the PHB content in the PHA blend is in the range of 5% to 90% by weight of the PHA in the PHA blend and the 3HP content in the PHB3HP is in the range of 7% to 15% by weight of the PHB3HP.

The PHA blend of PHB with a Type 1 PHB copolymer is a blend of PHB with PHB3HV where the PHB content of the PHA blend is in the range of 5% to 90% by weight of the PHA in the PHA blend and the 3HV content in the PHB3HV is in the range of 4% to 22% by weight of the PHB3HV.

The PHA blend of PHB with a Type 1 PHB copolymer is a blend of PHB with PHB4HB where the PHB content of the PHA blend is in the range of 5% to 90% by weight of the PHA in the PHA blend and the 4HB content in the PHB4HB is in the range of 4% to 15% by weight of the PHB4HB.

The PHA blend of PHB with a Type 1 PHB copolymer is a blend of PHB with PHB4HV where the PHB content of the PHA blend is in the range of 5% to 90% by weight of the PHA in the PHA blend and the 4HV content in the PHB4HV is in the range of 4% to 15% by weight of the PHB4HV.

The PHA blend of PHB with a Type 1 PHB copolymer is a blend of PHB with PHB5HV where the PHB content of the PHA blend is in the range of 5% to 90% by weight of the PHA in the PHA blend and the 5HV content in the PHB5HV is in the range of 4% to 15% by weight of the PHB5HV.

The PHA blend of PHB with a Type 1 PHB copolymer is a blend of PHB with PHB3HH where the PHB content of the PHA blend is in the range of 5% to 90% by weight of the PHA in the PHA blend and the 3HH content in the PHB3HH is in the range of 4% to 15% by weight of the PHB3HH.

The PHA blend of PHB with a Type 1 PHB copolymer is a blend of PHB with PHB3HX where the PHB content of the PHA blend is in the range of 5% to 90% by weight of the PHA in the PHA blend and the 3HX content in the PHB3HX is in the range of 4% to 15% by weight of the PHB3HX.

The PHA blend is a blend of a Type 1 PHB copolymer selected from the group PHB3HV, PHB3HP, PHB4HB, PHBV, PHV4HV, PHB5HV, PHB3HH and PHB3HX with a second Type 1 PHB copolymer which is different from the first Type 1 PHB copolymer and is selected from the group PHB3HV, PHB3HP, PHB4HB, PHBV, PHV4HV, PHB5HV, PHB3HH and PHB3HX where the content of the First Type 1 PHB copolymer in the PHA blend is in the range of 10% to 90% by weight of the total PHA in the blend.

The PHA blend of PHB with a Type 2 PHB copolymer is a blend of PHB with PHB4HB where the PHB content in the PHA blend is in the range of 30% to 95% by weight of the PHA in the PHA blend and the 4HB content in the PHB4HB is in the range of 20% to 60% by weight of the PHB4HB.

The PHA blend of PHB with a Type 2 PHB copolymer is a blend of PHB with PHB5HV where the PHB content in the PHA blend is in the range of 30% to 95% by weight of the PHA in the PHA blend and the 5HV content in the PHB5HV is in the range of 20% to 60% by weight of the PHB5HV.

The PHA blend of PHB with a Type 2 PHB copolymer is a blend of PHB with PHB3HH where the PHB content in the PHA blend is in the range of 35% to 95% by weight of the PHA in the PHA blend and the 3HH content in the PHB3HH is in the range of 35% to 90% by weight of the PHB3HX.

The PHA blend of PHB with a Type 2 PHB copolymer is a blend of PHB with PHB3HX where the PHB content in the PHA blend is in the range of 30% to 95% by weight of the PHA in the PHA blend and the 3HX content in the PHB3HX is in the range of 35% to 90% by weight of the PHB3HX.

The PHA blend is a blend of PHB with a Type 1 PHB copolymer and a Type 2 PHB copolymer where the PHB content in the PHA blend is in the range of 10% to 90% by weight of the PHA in the PHA blend, the Type 1 PHB copolymer content of the PHA blend is in the range of 5% to 90% by weight of the PHA in the PHA blend and the Type 2 PHB copolymer content in the PHA blend is in the range of 5% to 90% by weight of the PHA in the PHA blend.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHBHX content in the PHA blend in the range of 5% to 90% by weight of the PHA in the PHA blend where the 3HX content in the PHBHX is in the range of 35% to 90% by weight of the PHBHX.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB5HV content in the PHA blend in the range of 5% to 90% by weight of the PHA in the PHA blend where the 5HV content in the PHB5HV is in the range of 20% to 60% by weight of the PHB5HV.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB5HV content in the PHA blend in the range of 5% to 90% by weight of the PHA in the PHA blend and where the 5HV content in the PHB5HV is in the range of 30% to 90% by weight of the PHB5HV.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB3HX content in the PHA blend in the range of 5% to 90% by weight of the PHA in the PHA blend and where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB4HV content in the PHA blend in the range 5% to 90% by weight of the PHA in the PHA blend, where the 4HV content in the PHB4HV is in the range of 3% to 15% by weight of the PHB4HV, and a PHB5HV content in the PHA blend in the range of 5% to 90% by weight of the PHA in the PHA blend where the 5HV content in the PHB5HV is in the range of 30% to 90% by weight of the PHB5HV.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB5HV content in the PHA blend in the range of 5% to 90% by weight of the PHA in the PHA blend where the 5HV content in the PHB5HV is in the range of 20% to 60% by weight of the PHB5HV.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB3HX content in the PHA blend in the range of 5% to 90% by weight of the PHA in the PHA blend where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB3HX content in the PHA blend in the range of 5% to 90% by weight of the PHA in the PHA blend where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB5HV content in the PHA blend in the range of 5% to 90% by weight of the PHA in the PHA blend where the 5HV content in the PHB5HV is in the range of 20% to 60% by weight of the PHB5HV.

The PHA blend is a blend as disclosed in U.S. Published Application No. US 2004/0220355, by Whitehouse, published Nov. 4, 2004, which is incorporated herein by reference in its entirety.

Microbial systems for producing the PHB copolymer PHBV are disclosed in, e.g., U.S. Pat. No. 4,477,654 to Holmes, which is incorporated herein by reference in its entirety. U.S. Published Application No. US 2002/0164729 (also incorporated herein by reference in its entirety) by Skraly and Sholl describes useful systems for producing the PHB copolymer PHB4HB. Useful processes for producing the PHB copolymer PHB3HH have been described (Lee et al., 2000, *Biotechnology and Bioengineering* 67:240-244; Park et al., 2001, *Biomacromolecules* 2:248-254). Processes for producing the PHB copolymers PHB3HX have been described by Matsusaki et al. (*Biomacromolecules* 2000, 1:17-22).

In determining the molecular weight, techniques such as gel permeation chromatography (GPC) or flow injection polymer analysis (FIPA) can be used. In the GPC or FIPA methodology, a polystyrene standard is utilized either as a calibration standard or a check standard. For GPC, the weight average molecular reported from is relative to the polystyrene standards used (polystyrene equivalent weight). For FIPA, the weight average molecular weight reported is not relative to the polystyrene standard but rather is an absolute measurement of molecular weight. The PHA can have an absolute weight average molecular weight (in daltons) of at least 500, at least 10,000, or at least 50,000 and/or less than 2,000,000, less than 1,000,000, less than 1,500,000, and less than 800,000. In certain embodiments, preferably, the PHAs generally have a weight-average molecular weight in the range of 100,000 to 700,000. For example, the molecular weight range for PHB and Type 1 PHB copolymers for use in this application are in the range of 400,000 daltons to 1.5 million daltons as determined by GPC method and the molecular weight range for Type 2 PHB copolymers for use in the application 100,000 to 1.5 million daltons.

In certain embodiments, the PHA can have a linear equivalent weight average molecular weight of from about 150,000 Daltons to about 500,000 Daltons. As used herein, weight average molecular weight are determined by flow injection polymer analysis, using, e.g., THF is used as the eluent while chloroform is used as the diluent for the PHA samples.

In certain embodiments, the PHA can have a linear equivalent weight average molecular weight of from about 150,000 Daltons to about 500,000 Daltons and a polydispersity index of from about 2.5 to about 8.0. As used herein, weight average molecular weight and linear equivalent weight average molecular weight are determined by gel permeation chromatography, using, e.g., chloroform as both the eluent and diluent for the PHA samples. Calibration curves for determining molecular weights are generated using linear polystyrenes as molecular weight standards and a 'log MW vs elution volume' calibration method.

Blends

In certain embodiments, the polymers for use in the methods and compositions are blended in the presence of additives (e.g., nucleating agent(s), compatibilizer(s), anti-slip additive(s) and the like, co-agents and branching agents to form compositions with improved toughness properties. The percentages of PLA in the blend are 50% to 95% by weight, for example 70-95%. In certain compositions of the invention, the percentages of 3-hydroxybutyrate (3HB) copolymer of the total polymer compositions ranges from about 95% 3-hydroxybutyrate (3HB) copolymer to about 5% 3-hydroxybutyrate (3HB) copolymer or about 50% 3-hydroxybutyrate (3HB) copolymer to about 50% PLA. For example the PLA/3-hydroxybutyrate (3HB) copolymer ratio can be 95/5, 90/10, 85/15, 80/20, 75/25, 70/30, 65/35, 60/40, 55/45 or 50/50.

In certain embodiments, the polymers for use in the methods and compositions are blended in the presence of additives (e.g., nucleating agent(s), compatibilizer(s), anti-slip additive(s) and the like, co-agents and branching agents to form compositions with improved toughness properties. The percentages of PLA in the PLA/PHA blend are 50% to 95% by weight, for example 70-95%. In certain compositions of the invention, the percentages of PLA and PHA of the total polymer compositions ranges from about 95% PLA to about 5% PHA or about 50% PLA to about 50% PHA. For example the PLA/PHA ratio can be 95/5, 90/10, 85/15, 80/20, 75/25, 70/30, 65/35, 60/40, 55/45 or 50/50.

Branched Compositions

The term "branched polymer" refers to a composition of the invention with branching of the chain and/or cross-linking of two or more chains. Branching on side chains is also contemplated. Branching can be accomplished by various methods. The polymer blends described above can be branched by branching agents by free-radical-induced cross-linking of the polymer. Polyhydroxyalkanoate polymers can be branched in any of the ways described in U.S. Pat. Nos. 6,620,869, 7,208,535, 6,201,083, 6,156,852, 6,248,862, 6,201,083 and 6,096,810 all of which are incorporated herein by reference in their entirety.

The polymers of the invention can also be branched according to any of the methods disclosed in International Publication No. WO 2010/008447, titled "Methods For Branching PHA Using Thermolysis" or International Publication No. WO 2010/008445, titled "Branched PHA Compositions, Methods For Their Production, And Use In Applications," both of which were published in English on Jan. 21, 2010, and designated the United States. These applications are incorporated by reference herein in their entirety.

Branching Agents

The branching agents, also referred to as free radical initiators, for use in the compositions and method described herein include organic peroxides. Peroxides are reactive molecules, and react with polymer molecules or previously branched polymers by removing a hydrogen atom from the polymer backbone, leaving behind a radical. Polymer molecules having such radicals on their backbone are free to combine with each other, creating branched polymer molecules. Branching agents are selected from any suitable initiator known in the art, such as peroxides, azo-dervatives (e.g., azo-nitriles), peresters, and peroxycarbonates. Suitable peroxides for use in the present invention include, but are not limited to, organic peroxides, for example dialkyl organic peroxides such as 2,5-dimethyl-2,5-di(t-butylperoxy) hexane, 2,5-dimethyl-2,5-di(t-amylperoxy) hexane, 2,5-bis(t-butylperoxy)-2,5-dimethylhexane (available from Akzo Nobel as TRIGANOX® 101), 2,5-dimethyl-di(t-butylperoxy)hexyne-3, di-t-butyl peroxide, dicumyl peroxide, benzoyl peroxide, di-t-amyl peroxide, t-amylperoxy-2-ethylhexylcarbonate (TAEC), t-butyl cumyl peroxide, n-butyl-4,4-bis(t-butylperoxy)valerate, 1,1-di(t-butylperoxy)-3,3,5-trimethyl-cyclohexane, 1,1-bis(t-butylperoxy)-3,3,5-trimethylcyclohexane (CPK), 1,1-di(t-butylperoxy) cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy)propane, ethyl-3,3-di(t-amylperoxy) butyrate, t-butylperoxy-acetate, t-amylperoxyacetate, t-butylperoxybenzoate, t-amylperoxybenzoate, di-t-butyldiperoxyphthalate, and the like. Combinations and mixtures of peroxides can also be used. Examples of free radical initiators include those mentioned herein, as well as those described in, e.g., *Polymer Handbook*, 3$^{rd}$ Ed., J. Brandrup & E. H. Immergut, John Wiley and Sons, 1989, Ch. 2. Irradiation (e.g., e-beam or gamma irradiation) can also be used to generate polymer branching.

As discussed above, when peroxides decompose, they form very high energy radicals that can extract a hydrogen atom from the polymer backbone. These radicals have short half-lives, thereby limiting the population of branched molecules that is produced during the active time period.

Additives

In certain embodiments, various additives are added to the compositions. Examples of these additives include, but are not limited to, antioxidants, pigments, compatibilizers, thermal and UV stabilizers, inorganic and organic fillers, plasticizers, nucleating agents, anti-slip agents, anti-blocking agents and radical scavengers. Additionally, polyfunctional co-agents such as divinyl benzene, triallyl cyanurate and the like may be added. Such co-agents can be added to one or more of these additives for easier incorporation into the polymer. For instance, the co-agent can be mixed with a plasticizer, e.g., a non-reactive plasticizer, e.g., a citric acid ester, and then compounded with the polymer under conditions to induce branching. Other co-agents useful in the compositions of invention, for example, compositions of the first, second, third or fourth aspect are hyperbranched or dendritic polyesters, such as dendrtic and hyperbranched acrylates those sold by Sartomer, e.g., BOLTRON™ H20.

In poly-3-hydroxybutyrate compositions for use in the methods and compositions described herein, for example, plasticizers are often used to change the glass transition temperature and modulus of the composition, but surfactants may also be used. Lubricants may also be used, e.g., in injection molding applications. Plasticizers, surfactants and lubricants may all therefore be included in the overall composition.

In other embodiments, the compositions and methods of the invention include one or more plasticizers. Examples of plasticizers include phthalic compounds (including, but not limited to, dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limited to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), polyester compounds (including, but not limited to, reaction products of diols selected from butane diol, ethylene glycol, propane 1,2-diol, propane 1,3-diol, polyethylene glycol, glycerol, diacids selected from adipic acid, succinic acid, succinic anhydride and hydroxyacids such as hydroxystearic acid, epoxidized soy bean oil, chlorinated paraffins, chlorinated fatty acid esters, fatty acid compounds, plant oils, pigments, and acrylic compounds. The plasticizers may be used either alone respectively or in combinations with each other. Addition of plasticizers in the blend formulation can increase the biodegradation of the composition.

In certain embodiments, the compositions and methods of the invention include one or more surfactants. Surfactants are generally used to de-dust, lubricate, reduce surface tension, and/or densify. Examples of surfactants include, but are not limited to mineral oil, castor oil, and soybean oil. One mineral oil surfactant is DRAKEOL® 34, available from Penreco (Dickinson, Tex., USA). MAXSPERSE® W-6000 and W-3000 solid surfactants are available from Chemax Polymer Additives (Piedmont, S.C., USA). Nonionic surfactants with HLB values ranging from about 2 to about 16 can be used, examples being TWEEN®-20, TWEEN®-65, SPAN®-40 and SPAN®-85.

Anionic surfactants include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate.

One or more lubricants can also be added to the compositions and methods of the invention. Lubricants are normally used to reduce sticking to hot processing metal surfaces and can include polyethylene, paraffin oils, and paraffin waxes in combination with metal stearates. Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants are warmed and melted before or during processing of the blend.

In film applications of the compositions and methods described herein, anti-block masterbatch is also added. A suitable example is a slip anti-block masterbatch mixture of erucamide (20% by weight) diatomaceous earth (15% by weight) nucleant masterbatch (3% by weight), pelleted into PHA (62% by weight). Others are known to those of ordinary skill in the field of polymer processing.

Cross-Linking Agents

Cross-linking agents, also referred to as co-agents, used in the methods and compositions of the invention are cross-linking agents comprising two or more reactive functional groups such as epoxides or double bonds. These cross-linking agents modify the properties of the polymer. These properties include, but are not limited to, melt strength or toughness. One type of cross-linking agent is an "epoxy functional compound." As used herein, "epoxy functional compound" is meant to include compounds with two or more epoxide groups capable of increasing the melt strength of polyhydroxyalkanoate polymers by branching, e.g., end branching as described above.

When an epoxy functional compound is used as the cross-linking agent in the disclosed methods, a branching agent is optional. As such one embodiment of the invention is a method of branching a starting polyhydroxyalkanoate polymer (PHA), comprising reacting a starting PHA with an epoxy functional compound. Alternatively, the invention is a method of branching a starting polyhydroxyalkanoate polymer, comprising reacting a starting PHA, a branching agent and an epoxy functional compound. Alternatively, the invention is a method of branching a starting polyhydroxyalkanoate polymer, comprising reacting a starting PHA, and an epoxy functional compound in the absence of a branching agent. Such epoxy functional compounds can include epoxy-functional, styrene-acrylic polymers (such as, but not limited to, e.g., JONCRYL® ADR-4368 (BASF), or MP-40 (Kaneka)), acrylic and/or polyolefin copolymers and oligomers containing glycidyl groups incorporated as side chains (such as, but not limited to, e.g., LOTADER® (Arkema), poly(ethylene-glycidyl methacrylate-co-methacrylate)), and epoxidized oils (such as, but not limited to, e.g., epoxidized soybean, olive, linseed, palm, peanut, coconut, seaweed, cod liver oils, or mixtures thereof, e.g., Merginat ESBO (Hobum, Hamburg, Germany) and EDENOL® B 316 (Cognis, Dusseldorf, Germany)).

For example, reactive acrylics or functional acrylics cross-linking agents are used to increase the molecular weight of the polymer in the branched polymer compositions described herein. Such cross-linking agents are sold commercially. BASF, for instance, sells multiple compounds under the trade name JONCRYL®, which are described in U.S. Pat. No. 6,984,694 to Blasius et al., "Oligomeric chain extenders for processing, post-processing and recycling of condensation polymers, synthesis, compositions and applications," incorporated herein by reference in its entirety. One such compound is JONCRYL® ADR-4368CS, which is styrene glycidyl methacrylate and is discussed below. Another is MP-40 (Kaneka). And still another is the Petra line from Honeywell, see for example, U.S. Pat. No. 5,723,730. Such polymers are often used in plastic recycling (e.g., in recycling of polyethylene terephthalate) to increase the molecular weight (or to mimic the increase of molecular weight) of the polymer being recycled. Such polymers often have the general structure:

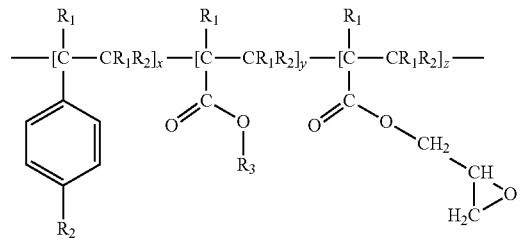

$R_1$ and $R_2$ are H or alkyl
$R_3$ is alkyl
x and y are 1-20
z is 2-20

E.I. du Pont de Nemours & Company sells multiple reactive compounds under the trade name ELVALOY®, which are ethylene copolymers, such as acrylate copolymers, elastomeric terpolymers, and other copolymers. One such compound is ELVALOY® PTW, which is a copolymer of ethylene-n-butyl acrylate and glycidyl methacrylate. Omnova sells similar compounds under the trade names "SX64053," "SX64055," and "SX64056." Other entities also supply such compounds commercially.

Specific polyfunctional polymeric compounds with reactive epoxy functional groups are the styrene-acrylic copolymers. These materials are based on oligomers with styrene and acrylate building blocks that have glycidyl groups incorporated as side chains. A high number of epoxy groups per oligomer chain are used, for example 5, greater than 10, or greater than 20. These polymeric materials generally have a molecular weight greater than 3000, specifically greater than 4000, and more specifically greater than 6000. These are commercially available from S.C. Johnson Polymer, LLC (now owned by BASF) under the trade name JONCRYL®, ADR 4368 material. Other types of polyfunctional polymer materials with multiple epoxy groups are acrylic and/or polyolefin copolymers and oligomers containing glycidyl groups incorporated as side chains. A further example of such a polyfunctional carboxy-reactive material is a co- or ter-polymer including units of ethylene and glycidyl methacrylate (GMA), available under the trade name LOTADER® resin, sold by Arkema. These materials can further comprise methacrylate units that are not glycidyl. An example of this type is poly(ethylene-glycidyl methacrylate-co-methacrylate).

Fatty acid esters or naturally occurring oils containing epoxy groups (epoxidized) can also be used. Examples of naturally occurring oils are olive oil, linseed oil, soybean oil, palm oil, peanut oil, coconut oil, seaweed oil, cod liver oil, or a mixture of these compounds. Particular preference is given to epoxidized soybean oil (e.g., Merginat ESBO from Hobum, Hamburg, or EDENOL® B 316 from Cognis, Dusseldorf), but others may also be used.

Another type of cross-linking agent are agents with two or more double bonds. Cross-linking agents with two or more double bond cross-link PHAs by after reacting at the double bonds. Examples of these include: diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate.

In general, it appears that compounds with terminal epoxides perform better than those with epoxide groups located elsewhere on the molecule.

Compounds having a relatively high number of end groups are the most desirable. Molecular weight may also play a role in this regard, and compounds with higher numbers of end groups relative to their molecular weight (e.g., the JONCRYL®s are in the 3000-4000 g/mol range) are likely to perform better than compounds with fewer end groups relative to their molecular weight (e.g., the Omnova products have molecular weights in the 100,000-800,000 g/mol range).

Nucleating Agents

If desired, an optional nucleating agent is added to the compositions of the invention to aid in its crystallization. In certain embodiments, the nucleating agent aids in the crystallization of the compositions. Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride; low-molecular organic compounds having a metal carboxylate group, for example, metal salts of such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, terephthalic acid monomethyl ester, isophthalic acid, and isophthalic acid monomethyl ester; high-molecular organic compounds having a metal carboxylate group, for example, metal salts of such as: carboxyl-group-containing polyethylene obtained by oxidation of polyethylene; carboxyl-group-containing polypropylene obtained by oxidation of polypropylene; copolymers of olefins, such as ethylene, propylene and butene-1, with acrylic or methacrylic acid; copolymers of styrene with acrylic or methacrylic acid; copolymers of olefins with maleic anhydride; and copolymers of styrene with maleic anhydride; high-molecular organic compounds, for example: alpha-olefins branched at their 3-position carbon atom and having no fewer than 5 carbon atoms, such as 3,3 dimethylbutene-1,3-methylbutene-1,3-methylpentene-1,3-methylhexene-1, and 3,5,5-trimethylhexene-1; polymers of vinylcycloalkanes such as vinylcyclopentane, vinylcyclohexane, and vinylnorbornane; polyalkylene glycols such as polyethylene glycol and polypropylene glycol; poly(glycolic acid); cellulose; cellulose esters; and cellulose ethers; phosphoric or phosphorous acid and its metal salts, such as diphenyl phosphate, diphenyl phosphite, metal salts of bis (4-tert-butylphenyl)phosphate, and methylene bis-(2,4-tert-butylphenyl)phosphate; sorbitol derivatives such as bis(p-methylbenzylidene) sorbitol and bis(p-ethylbenzylidene) sorbitol; and thioglycolic anhydride, p-toluenesulfonic acid and its metal salts. The above nucleating agents may be used either alone or in combinations with each other. In particular embodiments, the nucleating agent is cyanuric acid. In certain embodiments, the nucleating agent can also be another polymer (e.g., polymeric nucleating agents such as PHB).

In certain embodiments, the nucleating agent is selected from: cyanuric acid, carbon black, mica talc, silica, boron nitride, clay, calcium carbonate, synthesized silicic acid and salts, metal salts of organophosphates, and kaolin. In particular embodiments, the nucleating agent is cyanuric acid.

In various embodiments, where the nucleating agent is dispersed in a liquid carrier, the liquid carrier is a plasticizer, e.g., a citric compound or an adipic compound, e.g., acetyl-citrate tributyrate (CITROFLEX® A4, Vertellus, Inc., High Point, N.C.), or DBEEA (dibutoxyethoxyethyl adipate), a surfactant, e.g., Triton X-100, TWEEN-20, TWEEN-65, Span-40 or Span 85, a lubricant, a volatile liquid, e.g., chloroform, heptane, or pentane, a organic liquid or water.

In other embodiments, the nucleating agent is aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole.

In particular embodiments, the nucleating agent can include aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole. The nucleant can have a chemical formula selected from the group consisting of

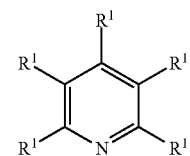

Formula 1

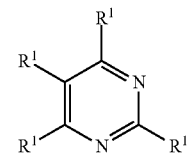

Formula 2

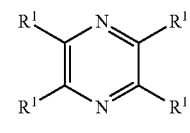

Formula 3

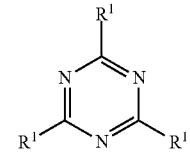

Formula 4

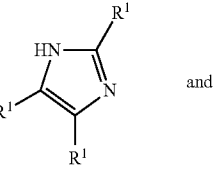

Formula 5 and

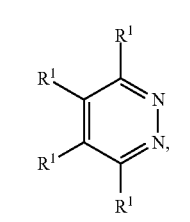

Formula 6

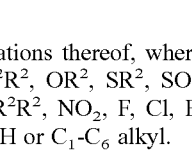

and combinations thereof, wherein each R1 is independently H, $NR^2R^2$, $OR^2$, $SR^2$, $SOR^2$, $SO_2R^2$, CN, $COR^2$, $CO_2R^2$, $CONR^2R^2$, $NO_2$, F, Cl, Br, or I; and each $R^2$ is independently H or $C_1$-$C_6$ alkyl.

The nucleating agent can be a nucleating agent as described in U.S. Published Application No. US 2005/0209377, by Allen Padwa, which is herein incorporated by reference in its entirety.

Another nucleating agent for use in the compositions and methods described herein are milled as described in International Publication No. WO 2009/129499, published in English on Oct. 22, 2009, and which designates the United States, which is herein incorporated by reference in its entirety. Briefly, the nucleating agent is milled in a liquid carrier until at least 5% of the cumulative solid volume of the nucleating agent exists as particles with a particle size of 5 microns or less. The liquid carrier allows the nucleating agent to be wet milled. In other embodiments, the nucleating agent is milled in liquid carrier until at least 10% of the cumulative solid volume, at least 20% of the cumulative solid volume, at least 30% or at least 40%-50% of the nucleating agent can exist as particles with a particle size of 5 microns or less, 2 microns or less or 1 micron or less. In alternative embodiments, the nucleating agents is milled by other methods, such as jet milling and the like. Additionally, other methods is utilized that reduce the particle size.

The cumulative solid volume of particles is the combined volume of the particles in dry form in the absence of any other substance. The cumulative solid volume of the particles is determined by determining the volume of the particles before dispersing them in a polymer or liquid carrier by, for example, pouring them dry into a graduated cylinder or other suitable device for measuring volume. Alternatively, cumulative solid volume is determined by light scattering.

Application of the Compositions

For the fabrication of useful articles, the compositions described herein are processed preferably at a temperature above the crystalline melting point of the polymers but below the decomposition point of any of the ingredients (e.g., the additives described above, with the exception of some branching agents) of the polymeric composition. While in heat plasticized condition, the polymeric composition is processed into a desired shape, and subsequently cooled to set the shape and induce crystallization. Such shapes can include, but are not limited to, a fiber, filament, film, sheet, rod, tube, bottle, or other shape. Such processing is performed using any art-known technique, such as, but not limited to, extrusion, injection molding, compression molding, blowing or blow molding (e.g., blown film, blowing of foam), calendaring, rotational molding, casting (e.g., cast sheet, cast film), or thermoforming. Thermoforming is a process that uses films or sheets of thermoplastic. The polymeric composition is processed into a film or sheet. The sheet of polymer is then placed in an oven and heated. When soft enough to be formed it is transferred to a mold and formed into a shape.

During thermoforming, when the softening point of a semi-crystalline polymer is reached, the polymer sheet begins to sag. The window between softening and droop is usually narrow. It can therefore be difficult to move the softened polymer sheet to the mold quickly enough. Branching the polymer can be used to increase the melt strength of the polymer so that the sheet maintains is more readily processed and maintains its structural integrity. Measuring the sag of a sample piece of polymer when it is heated is therefore a way to measure the relative size of this processing window for thermoforming.

The compositions described herein can be processed into films of varying thickness, for example, films of uniform thickness ranging from 1-200 microns, for example, 10-75 microns, 75 to 150 microns, or from 50-100 microns. Film layers can additionally be stacked to form multilayer films of the same or varying thicknesses or compositions of the same or varying compositions.

Blow molding, which is similar to thermoforming and is used to produce deep draw products such as bottles and similar products with deep interiors, also benefits from the increased elasticity and melt strength and reduced sag of the polymer compositions described herein.

Articles made from the compositions can be annealed according to any of the methods disclosed in International Publication No. WO 2010/008445, which was published in English on Jan. 21, 2010, and designated the United States, and is titled "Branched PHA Compositions, Methods For Their Production, And Use In Applications," which was filed in English and designated the United States. This application is incorporated by reference herein in their entirety.

As disclosed herein, "annealing" and "heat treatment" means a treatment where the polymer composition processed to a product in nonliquid form is subsequently (i.e., after the film is formed) heated for a period of time. This has been found to provide surprising and unexpected properties of puncture toughness and tear resistance in the films comprising the compositions of the invention. Preferably the flat film is heated to about 80° C. to about 140° C. for about 5 seconds to about 90 minutes, more preferably to about 90° C. to about 130° C. for about 10 minutes to about 70 minutes, and most preferably to about 110° C. to about 125° C. for about 15 minutes to about 60 minutes.

The compositions described herein are provided in any suitable form convenient for an intended application. For example, the composition is provided in pellet for subsequent production of films, coatings, moldings or other articles, or the films, coatings, moldings and other articles.

The polymeric compositions of the present invention can be used to create, without limitation, a wide variety of useful products, e.g., automotive, consumer durable, consumer disposable, construction, electrical, medical, and packaging products. For instance, the polymeric compositions can be used to make, without limitation, films (e.g., packaging films, agricultural film, mulch film, erosion control, hay bale wrap, slit film, food wrap, pallet wrap, protective automobile and appliance wrap, etc.), bags (e.g., trash bags, grocery bags, food bags, compost bags, etc.), hygiene articles (e.g., diapers, feminine hygiene products, incontinence products, disposable wipes, etc.), coatings for pelleted products (e.g., pelleted fertilizer, herbicides, pesticides, seeds, etc.), packaging (including, but not limited to, packaging and containers for food and beverage products, cosmetic products, detergents and cleaning products, personal care products, pharmaceutical and wellness products), golf tees, caps and closures, agricultural supports and stakes, paper and board coatings (e.g., for cups, plates, boxes, etc.), thermoformed products (e.g., trays, containers, yoghurt pots, plant pots, noodle bowls, moldings, etc.), housings (e.g., for electronics items, e.g., cell phones, PDA cases, music player cases, computer cases, printers, calculators, LCD projectors, connectors, chip trays, circuit breakers, plugs, and the like), wire and cable products (including, but not limited to, wire, cable and coatings for wire and cable for vehicles, cars, trucks, airplanes, aerospace, construction, military, telecommunication, utility power, alternative energy, and electronics), industrial products (such as, but not limited to, containers, bottles, drums, materials handling, gears, bearings, gaskets and seals, valves, wind turbines, and safety equipment), products for transportation (such as, but not limited to, automotive aftermarket parts, bumpers, window seals, instrument panels, consoles, under hood electrical parts, and engine covers), appliances and appliance parts (such as, but not limited to, refrigerators, freezers, washers, dryers, toasters, blenders, vacuum cleaners, coffee makers, and mixers), articles for use in building and construction (such as, but not limited to, fences, decks and rails, floors, floor covering, pipes and fittings, siding, trim, windows, doors, molding, and wall coverings), consumer goods and parts for consumer goods (such as, but not limited to, power hand tools, rakes, shovels, lawn mowers, shoes, boots, golf clubs, fishing poles, and watercraft), healthcare equipment (including, but not limited to, wheelchairs, beds, testing equipment, analyzers, labware, ostomy, IV sets, wound care, drug delivery, inhalers, and packaging). In short, the polymeric products described herein can be used to make the items currently made from conventional petroleum-based polymers.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

EXAMPLES

Experimental Methods

Measurement of Tensile Properties

The homopolymers and the blends were compression molded from pellets into plaques that were about 0.2 mm in thickness using a mold temperature of 200° C. The pellets were maintained at 200° C. for about one minute in the compression molder before they were quenched to room temperature. The tensile properties of these plaques were then measured on an Instron 3345 according to ASTM D882 at a speed of about 51 mm/min at room temperature. Modulus (MPa) was measured from the slope of the stress-strain curve, tensile elongation was measured as the % change in sample length before breaking, tensile strength (MPa) was measured as the maximum force achieved prior to breaking divided by the sample area (MPa) and the tensile toughness (J) was calculated as the area under the stress-strain curve. Tensile elongation to break and tensile toughness are the indicators that will be used to assess the toughness of the Blend component control (e.g., PLA control) and of the various blends.

Measurement of Melt Strength, Elasticity and Viscosity

Melt strength, G', melt viscosity, $\eta^*$, and melt elasticity were measured using oscillatory torsional rheology. The measurements were performed using a TA Instruments AR2000 rheometer employing a strain amplitude of 1%. First, compounded pellets were compression molded into 25 mm diameter discs that were about 1200 microns in thickness. The disc specimens were molded in a compression molder set at about 165-177° C., with a molding time of about 30 seconds. The molded discs were then placed in between the 25 mm parallel plates of the AR2000 rheometer, equilibrated at 185° C. to ensure complete melting of all PHA blend components, and subsequently cooled to 160° C. prior to a frequency sweep test. A gap distance between the parallel plates of 800-900 µm was used, depending on the normal forces exerted by the polymer. After the final gap distance was set, and excess material from the sides of the platens was scraped off, the specimen was then cooled to 160° C. where a frequency scan from 0.10 rad/s to 625 rad/s was then carried out; frequencies lower than 0.1 rad/s were avoided because of considerable PHA degradation over the long time it takes for these lower frequency measurements.

During the frequency sweep performed at 160° C., the following data was collected as a function of measurement frequency: $\eta^*$ or complex viscosity, G' or elastic modulus (elastic or solid-like contribution to the viscosity) and G" or loss modulus (viscous or liquid-like contribution to the viscosity). For purposes of simplicity, G' measured at an imposed frequency ($\omega$) of 0.25 rad/s as a measure of "melt strength" was used. Higher G' value therefore translated to higher melt strength. Melt elasticity was calculated using the following equation: $ME=(G'/\eta^*\times\omega)$ where $\omega$ was 0.25 rad/s. The melt elasticity is a dimensionless number which indicates the relative elasticity of a polymer. The closer the value of the melt elasticity is to 1, the more elastic the polymer.

Measurement of Tear Strength

The Elmendorf resistance to tear propagation was measured according to ASTM D 1922-06. The tear propagation resistance of the film was measured in two directions, along the flow exiting the die ("machine direction tear" or "MD Tear") and also perpendicular to the polymer flow exiting the die ("transverse direction tear" or "TD Tear"). The resistance to tear is reported in units of g/mil film thickness.

Measurement of Impact Resistance (Puncture Resistance)

The impact resistance of the films of the blended polymers of the compositions was measured by the Dart Impact test (ASTM D1709). In this test, a falling weight with a ball end or conical nose is dropped from a predetermined height on a film sample clamped in a holder. The energy required to fail the film is calculated by multiplying the weight of dart times the height. In the examples that follow, the Dart Impact is calculated by dividing the dart weight (g) by the film thickness (mils). This measurement gives an indication of the puncture resistance of the film.

Measurement of PHA Molecular Weight

The absolute weight average molecular weight for the PHA materials was determined by using a flow injection polymer analysis (FIPA) system (TDAmax™, Viscotek Corp, Houston, Tex.). This is a liquid chromatography technique whereby the polymer to be measured is first dissolved in a solvent, filtered and then injected into the FIPA instrument. Once injected, the polymer solution is carried by mobile phase solvent and elutes through a single, low volume size exclusion chromatography column. The column acts to separate the polymer, solvent and any other impurities present in the sample. The detection system consists of a refractive index, light scattering and solution viscosity detectors. The absolute weight average molecular weight of the polymer is determined using the light scattering detector.

To prepare the polymer sample, it was first dissolved in chloroform to a concentration of 2.0 mg/ml at 60° C. After cooling the sample, it was then filtered with a 0.2 micrometer Teflon syringe filter and injected into the instrument. The FIPA unit operated at a temperature of 45° C. with tetrahydrofuran solvent as the mobile phase. The mobile flow rate was 1.0 ml/min. A 100 µl injection volume was used for the analysis of the polymer solution. Once the sample chromatogram was collected, it was the analyzed with the Viscotek Omni-Sec software to determine the absolute weight average molecular weight in units of grams/mole.

Measurement of PHA Composition

The weight percent 4-hydroxybutyrate contained in the PHA copolymers was determined by acid alcoholysis followed by GC-FID analysis. A 10-15 mg sample of the dry copolymer was first weighed in to a test tube. Then 2-5 ml of a reagent containing n-butanol (99%, EMD), 4M HCl in dioxane (Sigma Aldrich) and the internal standard diphenylmethane was pipetted in to the test tube. The test tube was capped and heated at 93° C. for 6 hours using a heater block. After the alcoholysis reaction was completed, the test tube contents were cooled to room temperature and 2-5 ml of DI water was added. The mixture was centrifuged and the organic top layer was pipetted out of the test tube and into a GC vial. The GC vial contents were then run on an Agilent Technologies, Model 6890N, GC-FID System having a ZB-35 30 m×0.25 mm×0.25 μm GC-FID column (Phenomenex). Standards for quantitating the weight %4HB in the copolymer were also prepared using γ-butyrolactone (99%, Sigma Aldrich).

PHA Materials

The PHA polymers utilized in the blend examples along with their weight average molecular weights and compositions are summarized in Table 1. All of the PHA's contained copolymers of 3-hydroxybutyrate and 4-hydroxybutyrate (P3HB-4HB) or where indicated were a blend of these copolymers having different %4HB content or blends of poly-3-hydroxybutyrate (P3HB) with P3HB-4HB. The table shows a measured % biobased content as well as an estimated % biobased content for each PHA material which was derived from the weight %4HB in each PHA. Where the % biobased content is <100%, the feed source for 4HB production during microbial fermentation was 1,4-butanediol (Sigma Aldrich) while the feed source of 3HB was glucose from plant origin; where the biobased content is 100%, the feed source for 4HB and 3HB production during microbial fermentation was glucose from plant origin only.

TABLE 1

Summary of PHA polymers used in the blend examples. All of the polymers are copolymers of 3-hydroxybutyrate and 4-hydroxybutyrate except where indicated.

| Polymer ID | $M_w$ | Weight % 4HB | Estimated % Biobased Content | Measured % Biobased Content |
|---|---|---|---|---|
| PHA A* | 652,889 | 16.8 | 83.2 | 83 |
| PHA B | 159,000 | 25.5 | 74.5 | 71 |
| PHA C | 1,135,000 | 40.3 | 100 | 99 |
| PHA D | 963,000 | 27.7 | 72.3 | 73 |

*Blend of 10-14% P3HB, 46-50% P3HB-4HB copolymer with 8-14% 4HB by weight and 38-42% P3HB-4HB "rubber phase" copolymer with 25-33% 4HB by weight.

The high 4HB content of the PHA's B, C and D suppress the copolymer crystallinity making it mostly amorphous (no $T_m$) and impart a fairly low $T_g$ to the copolymers in the range of −15 to −40° C. These materials therefore have rubber-like properties and can behave as toughening agents in polymer blends. Note that PHA A also has 38-42% by weight P3HB-4HB rubber phase present which has a %4HB content of 25-33% although the overall weight % 4HB is only 16.8%.

Blend Additives

Several additives were also included with the PHA blend formulations used in the examples. They were as follows: CITROFLEX® A4 (Vertellus Specialties Inc.) which is a monomeric citrate butyl ester plasticizer; ACRAWAX® CV (Lonza) is a vegetable-based ethylene-bis-stearamide wax; FILMLINK® 500 (Imerys) is an ultrafine calcium carbonate filler which as a surface coating to prevent agglomeration; TRIGONOX® 131 (Akzo Nobel) is an the organic peroxide tert-amylperoxy 2-ethylhexyl carbonate; LOTADER® AX 8900 (Arkema) is a terpolymer of ethylene, acrylic acid ester and glycidyl methacrylate used as a toughening agent in polyester resin formulations.

Example 1

Effect of PHA MW, %4HB and Reactive Extrusion on Properties of PLA/PHA Blends

In this example, the mechanical and rheological properties of several PLA/PHA film blends were compared as a function of PHA molecular weight and addition of peroxide branching agent. The PLA materials used in the blends were Ingeo® 2003D and 4032D resins (NatureWorks LLC). The 2003D is an optically clear, general purpose, extrusion grade resin mainly for use in food packaging film applications while the 4032D is an opaque resin having a lower molecular weight which is used primarily for laminating film applications. A summary of the PHA blend formulations and properties are shown in Table 2. Also included in the table are results for a PHA/PLA blend having the toughening additive LOTADER® 8900 as a component (Formulation 6). The blend formulations were prepared by first compounding the raw resin and additives together using a 16 mm PRISM (Thermo Electron) co-rotating twin-screw extruder with the following temperature profile (inlet-to-outlet): 170° C./171° C./173° C./175° C./175° C./177° C./177° C./177° C./177° C./177° C. at a screw speed of 250 rpm. After compounding, each formulation was pelletized, dried and then fed to a Randacastle cast film extruder for preparing the cast films for testing. The extruder had a temperature profile (inlet-to-outlet) set to 390° F./380° F./350° F./330° F./330° F./330° F., a screw speed of 30 rpm and a 20 mil die gap which produced a 2-2.5 mil thick film. The extruded film was cast onto a heated roll set at 100-110° F.

After compounding, each formulation was pelletized, dried and then fed to a Randacastle cast film extruder of preparing the cast films for testing. The extruder had a temperature profile inlet-to-outlet set to 390° F./380° F./350° F./330° F./330° F./330° F., a screw speed of 30 rpm and a 20 mil die gap which produced a 2 mil thick film. The extruded film was cast onto a heated roll set at 100° F.

TABLE 2

Summary of PLA/PHA blend data. PHA's are a single copolymer of P3HB-4HB with high %4HB content or blends of P3HB-co-4HB. Also included is data for a PHA/PLA blend formulation containing a polyester toughening additive, Lotader ® 8900.

| | Formulation | | | | | | |
|---|---|---|---|---|---|---|---|
| | 1 | 2 | 3 | 4 | 5 | 6 | 7 |
| PLA INGEO ® 2003D | 89 | 0 | 59 | 0 | 59 | 54 | 59 |
| PLA INGEO ® 4032D | 0 | 89 | 0 | 59 | 0 | 0 | 0 |
| PHA A* | 0 | 0 | 30 | 30 | 30 | 30 | 0 |

TABLE 2-continued

Summary of PLA/PHA blend data. PHA's are a single copolymer of
P3HB-4HB with high %4HB content or blends of P3HB-co-4HB. Also included is
data for a PHA/PLA blend formulation containing a polyester toughening additive,
Lotader ® 8900.

| | Formulation | | | | | | |
|---|---|---|---|---|---|---|---|
| | 1 | 2 | 3 | 4 | 5 | 6 | 7 |
| PHA B | 0 | 0 | 0 | 0 | 0 | 0 | 30 |
| CITROFLEX ® A4 | 5 | 5 | 5 | 5 | 4.8 | 5 | 4.8 |
| TRIGONOX ® 131 | 0 | 0 | 0 | 0 | 0.2 | 0 | 0.2 |
| LOTADER ® 8900 | 0 | 0 | 0 | 0 | 0 | 5 | 0 |
| ACROWAX ® CV | 0.5 | 0.5 | 0.5 | 0.5 | 0.5 | 0.5 | 0.5 |
| FILMLINK ® 500 | 5.5 | 5.5 | 5.5 | 5.5 | 5.5 | 5.5 | 5.5 |
| Total (wt %) | 100 | 100 | 100 | 100 | 100 | 100 | 100 |
| Mechanical and Melt Properties | | | | | | | |
| G' @ 0.25 rad/s (Pa) | 117 | 112 | 266 | 272 | 3730 | 407 | 1644 |
| η* @ 0.25 rad/s (Pa · s) | 7862 | 8465 | 7718 | 7491 | 23850 | 7483 | 13170 |
| η* @ 100 rad/s (Pa · s) | 1919 | 2087 | 1726 | 1693 | 1498 | 1424 | 1292 |
| Melt Elasticity | 0.06 | 0.05 | 0.14 | 0.15 | 0.63 | 0.22 | 0.50 |
| MD Tear (g/mil) | 9 | — | 24 | 22 | 23 | 14 | 16 |
| Tensile Strength (MPa) | 36.6 | — | 37.7 | 30.2 | 25.5 | 27.7 | 29.4 |
| Tensile Elongation (%) | 9 | — | 5 | 6 | 116 | 153 | 193 |
| Tensile Toughness (J) | 0.02 | — | 0.01 | 0.01 | 0.28 | 0.19 | 0.35 |

*Blend of 10-14% P3HB, 46-50% P3HB-4HB copolymer with 8-14% 4HB by weight and 38-42% P3HB-4HB "rubber phase" copolymer with 25-33% 4HB by weight.

As shown in Table 2, the Formulations 1 and 2 were composed of only PLA (100% biobased) without the addition of PHA and as such were run as controls. The mechanical and rheological data for the PLA homopolymers showed that without addition of PHA, the PLA's had low melt strength (G'), high melt viscosity (@100 rad/s), low elongation, tear strength and toughness but high tensile strength. This was consistent with the known properties of PLA's mainly that they are a highly crystalline, stiff material with exceptionally low toughness which makes them therefore unsuitable for some applications like film processing. Formulations 3 and 4 show that with the addition of 30% by weight PHA A (83% biobased) to the PLA resins, the melt strength and viscosity increased as well as the tear strength and melt elasticity. However, the tensile toughness did not show much improvement. Formulation 5 was identical to that of Formulation 3 except that it included a peroxide branching agent. The results showed that with the addition of branching agent, the melt strength and mechanical toughness improved dramatically over the PLA Formulations 1 and 2. The tensile strength and the melt viscosity (@100 rad/s) were shown to decrease as well as. All of the property improvements (lower melt viscosity, higher melt strength and elasticity) show this formulation to be a good candidate for film processing applications. Formulation 6, a 30% PHA A/PLA blend with the addition of a commercial polyester toughening agent, showed similar improvements in mechanical and rheological properties but had lower melt strength and tear strength. Formulation 7 was a PLA blend with 30% PHA B and peroxide branching agent added. As with Formulation 5, this sample had very high toughness and elongation but had lower melt strength, melt viscosity and melt elasticity as compared to Formulation 5. The reasons are likely due to the differences in the PHA materials themselves. PHA B was a lower molecular weight, higher %4HB copolymer. Properties such as melt strength, viscosity and melt elasticity are sensitive to the polymer molecular weight and were therefore more impact by the 6× lower molecular weight of the PHA B as compared to PHA A. However, the observed improvement in toughness was likely due to the 2× higher "rubber phase" P3HB-4HB copolymer in PHA B as compared to PHA A. It can be concluded from this Example that improvements in PLA/PHA blends mechanical and melt properties were correlated to the addition of P3HB-4HB copolymers with higher %4HB content, higher P3HB-4HB molecular weight and the use of a peroxide branching agent.

Example 2

Preparation of Reactively Extruded PLA/PHA Blends Using 100% Biobased High and Low Molecular Weight P3HB-4HB Rubber Copolymer In this example, several PLA/PHA blends are compared one of which had a high molecular weight ($M_w=1.1\times10^6$ g/mole), high 4HB content (40%), 100% biobased P3HB-4HB "rubber" copolymer. The formulations and their mechanical and melt properties are shown in Table 4. All of the formulations were prepared as outlined in Example 1 with the addition of a peroxide branching agent.

TABLE 3

Summary of PLA/PHA reacted blend data. PHA C is a 100% biobased
P3HB-4HB "rubber" copolymer having % 4HB content of 40% and
a $M_w = 1.1 \times 10^6$ g/ mole.

| | Formulation | | | |
|---|---|---|---|---|
| | 1 | 2 | 3 | 4 |
| PLA INGEO ® 4043D | 59 | 69 | 59 | 59 |
| PHA A | 30 | 0 | 0 | 0 |

TABLE 3-continued

Summary of PLA/PHA reacted blend data. PHA C is a 100% biobased P3HB-4HB "rubber" copolymer having % 4HB content of 40% and a $M_w = 1.1 \times 10^6$ g/mole.

| | Formulation | | | |
|---|---|---|---|---|
| | 1 | 2 | 3 | 4 |
| PHA C | 0 | 20 | 30 | 0 |
| PHA D | 0 | 0 | 0 | 30 |
| 1.5% TRIGONOX ® 131 in CITROLFEX A4 | 5 | 5 | 5 | 5 |
| ACRAWAX ® CV | 0.5 | 0.5 | 0.5 | 0.5 |
| FILMLINK ® 500 | 5.5 | 5.5 | 5.5 | 5.5 |
| Total (wt %) | 100 | 100 | 100 | 100 |
| Mechanical and Melt Properties | | | | |
| G' @ 0.25 rad/s (Pa) | 670 | 892 | 1627 | 872 |
| η* @ 0.25 rad/s (Pa · s) | 7982 | 13900 | 16680 | 11630 |
| η* @ 100 rad/s (Pa · s) | 1359 | 2115 | 1926 | 1703 |
| Melt Elasticity | 0.34 | 0.26 | 0.39 | 0.30 |
| MD Tear (g/mil) | 11 | 59 | 349 | 82 |
| Tensile Strength (MPa) | 30 | 44.8 | 34.1 | 44.2 |
| Tensile Elongation (%) | 11 | 195 | 210 | 186 |
| Tensile Toughness (J) | 0.03 | 0.39 | 0.39 | 0.31 |

In this example, PHA C, a 100% biobased, high molecular weight, P3HB-4HB "rubber" when blended with PLA and a branching agent at 30% PHA (Formulation 3) showed significantly better mechanical property improvements especially for the tear strength (40 times better than pure PLA), tensile elongation (23 times better than PLA) and toughness (20 times higher than PLA). The melt strength, viscosity and elasticity were also significantly higher indicating that blown and cast films could be made using this formulation. Formulation 2 shows data for a PLA/PHA C reactive blend where PHA C was only added at 20% by weight. The lower weight % PHA C was shown to decrease the tear strength by a factor of 7 and the melt strength by a factor of 1.8. However the toughness did not appear to be affected significantly by the lower PHA C weight %. Formulation 4 which consisting of PLA blended and branched with 30% P3HB-4HB copolymer having only 28% 4HB content showed significantly lower tear properties and slightly lower toughness than the PLA/PHA blend in Formulation 3. The conclusions from this example were that high molecular weight, 100% biobased P3HB-4HB "rubber" copolymer with high %4HB (40% 4HB) content combined with a branching agent gave the best overall mechanical properties for the PLA/PHA blend. Another PLA/rubber PHA blend similar to that of Formulation 3 in Table 3 was prepared with the P3HB-4HB copolymer having a %4HB content of 55% by weight with a lower $M_w$ of 465,000. When the tear strength of this blend composition was measured, it gave a value of 165 g/mil which was considered too low for most blown film applications. These results indicate that optimum tear properties with a PLA/rubber PHA blend are likely to be found with a P3HB-4HB copolymer having a %4HB content of 40-75% by weight combined with a weight average molecular weight between 465,000-1,500,000 daltons.

Other than in the examples herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

While this invention has been particularly shown and described with references to preferred embodiments thereof, it will be understood by those skilled in the art that various changes in form and details may be made therein without departing from the scope of the invention encompassed by the appended claims.

What is claimed is:

1. A composition, comprising a biodegradable branched polymer blend formed by reactive blending of:
   a. polylactic acid (PLA); and
   b. a biodegradable polyhydroxyalkanoate (PHA) polymer having a glass transition temperature (Tg) of between −5° C. and −50° C. and a weight average molecular weight from 500,000 Daltons to 2,000,000 Daltons, wherein the PHA polymer is a copolymer of:
3-hydroxybutyrate and 4-hydroxybutyrate, wherein the content of 4-hydroxybutyrate in the PHA polymer is from about 25% to about 85% by weight of the PHA polymer;
wherein the copolymer of 3-hydroxybutyrate and 4-hydroxybutyrate is the sole PHA polymer in the polymer blend,
wherein the content of the PHA polymer in the biodegradable branched polymer blend is between about 3% and about 40% by weight of the blend, and
wherein the renewable carbon content of the biodegradable branched polymer blend is at least 95% by weight of the blend,
wherein the biodegradable branched polymer blend was formed by reactive blending of the PLA and the PHA polymer with a branching agent.

2. The composition of claim 1, wherein the renewable carbon content of the biodegradable branched polymer blend is at least 99% by weight of the blend.

3. The composition of claim 1, wherein the branching agent is selected from: dicumyl peroxide, t-amyl-2-ethylhexyl peroxycarbonate, 1,1-bis(t-butylperoxy)-3,3,5-trimethylcyclohexane, 2,5-dimethyl-2,5-di(t-butylperoxy) hexane, 2,5-dimethyl-2,5-di(t-amyl peroxy) hexane, 2,5-bis (t-butylperoxy)-2,5-dimethylhexane, 2,5-dimethyl-di(t-butylperoxy)hexyne-3, di-t-butyl peroxide, benzoyl peroxide, di-t-amyl peroxide, t-butyl cumyl peroxide, n-butyl-4,4-bis (t-butylperoxy)valerate, 1,1-di(t-butylperoxy)-3,3,5-trimethyl-cyclohexane, 1,1-di(t-butylperoxy)cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy) propane, ethyl-3,3-di(t-amylperoxy)butyrate, t-butylperoxyacetate, t-amylperoxyacetate, t-butylperoxybenzoate, t-amylperoxybenzoate, and di-t-butyldiperoxyphthalate or combinations thereof.

4. The composition of claim 1, wherein the PLA and the PHA polymer were reactively blended with a branching agent in the presence of a co-agent.

5. The composition of claim 4, wherein the co-agent is diallyl phthalate, pentaerythritol tetraacrylate, trimethylolpropane triacrylate, pentaerythritol triacrylate, dipentaerythritol pentaacrylate, diethylene glycol dimethacrylate, bis (2-methacryloxyethyl) phosphate, or combinations thereof.

6. The composition of claim 4, wherein the co-agent is an epoxy-functional styrene-acrylic polymer, an epoxy-functional acrylic copolymer, an epoxy-functional polyolefin copolymer, an oligomer comprising a glycidyl group with an epoxy functional side chain, an epoxy-functional poly(ethylene-glycidyl methacrylate-co-methacrylate), or an epoxidized oil or combinations thereof.

7. The composition of claim 1, wherein the content of 4-hydroxybutyrate (4HB) in the PHA polymer is from 30% to 65% by weight of the PHA polymer.

8. The composition of claim 1, wherein the content of 4-hydroxybutyrate (4HB) in the PHA polymer is from 45% to 65% by weight of the PHA polymer.

9. The composition of claim 1, wherein the PHA polymer comprises an amorphous rubber phase having no melting point.

10. A film or multilayer laminate comprising at least one film layer comprising the composition of claim 1.

11. An article made with the laminate of claim 10, wherein the film has a thickness of about 1 to about 2 microns.

12. The article of claim 11, wherein the article is a bag, a packaging film or an agricultural mulch film.

13. A resin composition made from the composition according to claim 1.

14. A finished article made by extrusion processing of the resin composition of claim 13, wherein the article is an injection molded part, a thermoformed part, a film or a coating.

15. An article made with the composition of claim 1, wherein the article is a foam, a woven or nonwoven fiber, or a thermoformed part.

16. A method of preparing a polylactic acid (PLA)/polyhydroxyalkanoate (PHA) polymer blend, comprising reactively blending in the presence of a branching agent,
  a. polylactic acid (PLA); and
  b. a biodegradable polyhydroxyalkanoate (PHA) polymer having a glass transition temperature (Tg) of between −5° C. and −50° C. and a weight average molecular weight from 500,000 Daltons to 2,000,000 Daltons, wherein the PHA polymer is a copolymer of:
    3-hydroxybutyrate and 4-hydroxybutyrate, wherein the content of 4-hydroxybutyrate in the PHA polymer is about 25% to about 85% of the weight of the PHA polymer;
    wherein the copolymer of 3-hydroxybutyrate and 4-hydroxybutyrate is the sole PHA polymer in the polymer blend;
  wherein the content of the PHA polymer in the PLA/PHA polymer blend is from about 3% to about 40% by weight of the PLA/PHA polymer blend, and
  wherein the renewable carbon content of the PLA/PHA polymer blend is at least 95% by weight of the PLA/PHA polymer blend;
  thereby forming a PLA/PHA polymer blend.

* * * * *